(12) United States Patent
Yagi et al.

(10) Patent No.: US 8,578,711 B2
(45) Date of Patent: Nov. 12, 2013

(54) MASTER CYLINDER

(75) Inventors: Ryoichi Yagi, Minami-Alps (JP);
Naganori Koshimizu, Kai (JP); Takato Ogiwara, Minami-Alps (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 747 days.

(21) Appl. No.: 12/870,330

(22) Filed: Aug. 27, 2010

(65) Prior Publication Data

US 2011/0048226 A1 Mar. 3, 2011

(30) Foreign Application Priority Data

Sep. 1, 2009 (JP) ............................... P2009-201800

(51) Int. Cl.
*F15B 7/08* (2006.01)
(52) U.S. Cl.
USPC .............................................. 60/591; 60/588
(58) Field of Classification Search
USPC .................... 60/585, 586, 588, 591
See application file for complete search history.

(56) References Cited

U.S. PATENT DOCUMENTS

| 4,781,024 A | 11/1988 | Nakamura |
| 7,694,517 B2 * | 4/2010 | Ogiwara et al. ................ 60/591 |
| 7,841,178 B2 * | 11/2010 | Mouri et al. .................... 60/588 |
| 8,286,427 B2 * | 10/2012 | Ogiwara et al. ................ 60/591 |

FOREIGN PATENT DOCUMENTS

| JP | U-61-148748 | 9/1986 |
| JP | U-02-060703 | 5/1990 |
| JP | A-07-149225 | 6/1995 |
| JP | 2008-230283 | 10/2008 |
| JP | A-2009-040346 | 2/2009 |
| JP | A-2009-061849 | 3/2009 |

OTHER PUBLICATIONS

Office Action issued in Japanese Patent Appl 2009-201800 on Apr. 23, 2013 with corresponding English Language Translation.

* cited by examiner

*Primary Examiner* — Michael Leslie
(74) *Attorney, Agent, or Firm* — Nixon & Vanderhye P.C.

(57) ABSTRACT

A master cylinder includes a cylinder body which an operating fluid is introduced from a reservoir, a piston which is slidably fitted in the cylinder body and defines a pressure chamber inside the cylinder body, a supply pathway which is formed in the cylinder body and supplies the operating fluid from the reservoir to the pressure chamber, a bypass pathway which bypasses the supply pathway and allows the reservoir to communicate with the pressure chamber, and a check valve which is installed in the bypass pathway and opens a valve when the pressure inside the pressure chamber is lower than the pressure of the reservoir.

20 Claims, 12 Drawing Sheets

MASTER CYLINDER

BACKGROUND OF THE INVENTION

1. Field of the Invention

The present invention relates to a master cylinder. More specifically, the present invention relates to a master cylinder that generates a fluid pressure.

Priority is claimed on Japanese Patent Application No. 2009-201800, filed on Sep. 1, 2009, the content of which is incorporated herein by reference.

2. Description of the Related Art

For example, JP-A-2008-250283 discloses a master cylinder that is equipped with a high flow valve through which a relatively large amount of an operating fluid of a reservoir flows by the suction from a downstream side.

In the master cylinder, a structure allowing the operating fluid of the reservoir to flow by the suction from the downstream side is large.

SUMMARY OF THE INVENTION

The present invention provides a master cylinder capable of allowing an operating fluid of a reservoir to smoothly flow into a downstream side by the suction from the downstream side while suppressing an increase in size of the master cylinder.

According to a first aspect of the present invention, a cup seal is disposed inside a bypass pathway, and is configured to permit the flow of an operating fluid from a reservoir to a pressure chamber in such a manner that its lip portion is bent to be separated front the inner circumferential surface of the bypass pathway, and to interrupt the flow of the operating fluid in a reverse direction in such a manner that the lip portion comes into contact with the inner circumferential surface.

According to another aspect of the present invention, a cup seal is disposed inside a cylinder pathway to define a control valve chamber and a small diameter pressure chamber, and is configured to permit the flow of an operating fluid from the control valve chamber to the small diameter pressure chamber by bending its lip portion, and to interrupt the flow of the operating fluid in a reverse direction.

According to the aspects of the present invention, it is possible to provide a master cylinder capable of allowing an operating fluid of a reservoir to smoothly flow into the downstream side by the suction from the downstream side while suppressing an increase in size of the master cylinder.

DETAILED DESCRIPTION OF THE INVENTION

Hereinafter, embodiments of the present invention will be described with reference to the accompanying drawings.

First Embodiment

A first embodiment of the present invention will be described with reference to FIGS. 1 to 3.

Figure 1:
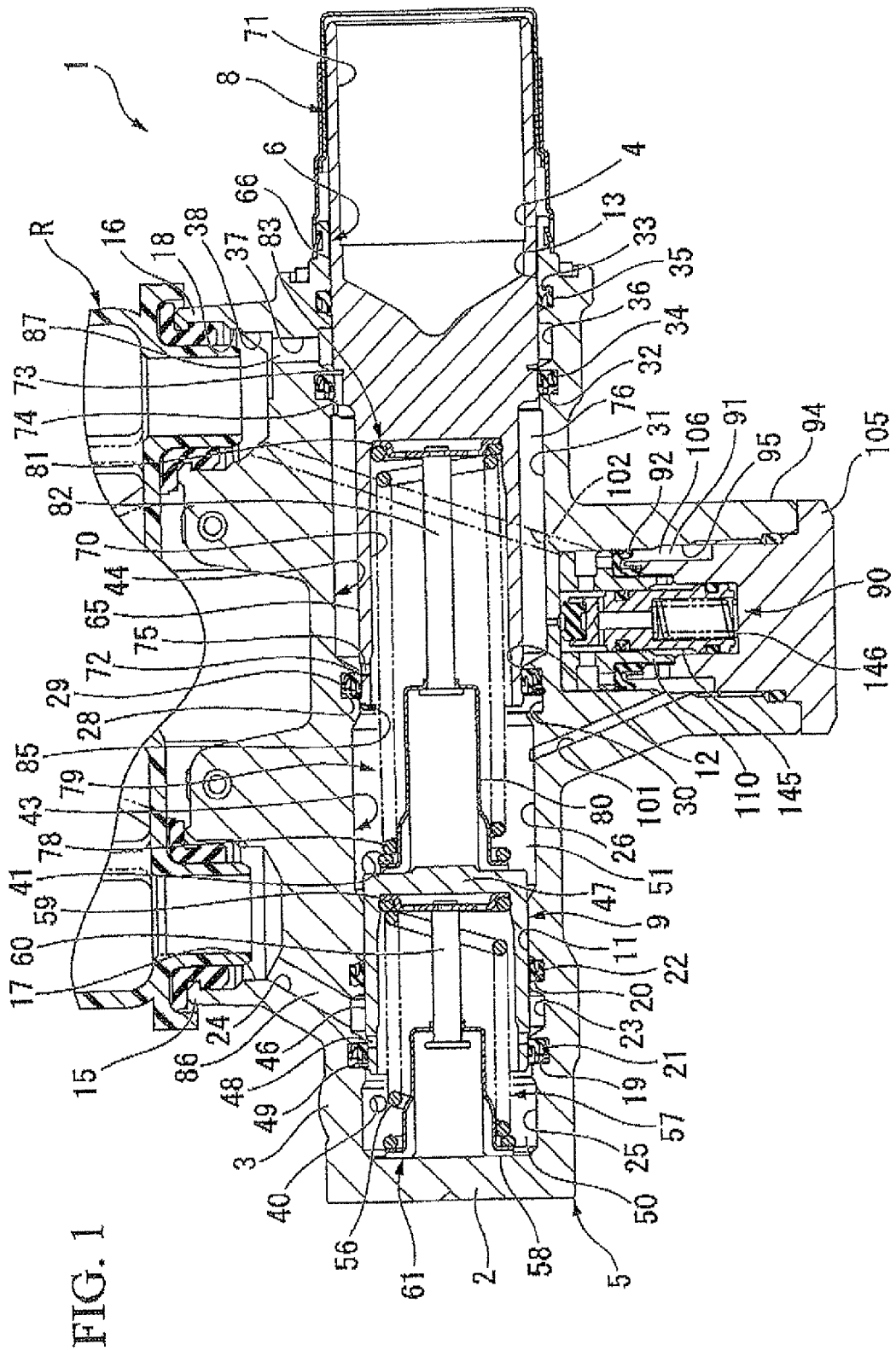
FIG. 1 is a main cross-sectional view showing a master cylinder according to a first embodiment of the present invention.

As shown in FIG. 1, a master cylinder 1 according to the first embodiment is referred to as a plunger-type master cylinder. Although it is not shown in the drawings, the master cylinder 1 is configured to generate an operating fluid pressure to be introduced into a brake device such as a disk brake by being pressed by an output shaft of a booster moving in response to an operation of a brake pedal.

The master cylinder 1 is of a tandem type including a cylinder body (a stepped cylinder) 5 which is formed as a bottomed cylinder having a bottom portion 2 and a cylindrical portion 3 and is attached to a booster (not shown) on the side of an opening portion 4, a primary piston (a piston or a stepped piston) 8 which is slidably fitted in the side of the operating portion 4 of a bore 6 inside the cylinder body 5 along an axis (hereinafter, referred to as a cylinder axis) of the cylindrical portion 3, and a secondary piston (another piston) 9 which is slidably fitted in the side closer to the bottom portion 2 than the primary piston 8 inside the bore 6 of the cylinder body 5 in the direction of the cylinder axis. Further, in this embodiment, the cylinder axis is aligned with the horizontal direction.

In the bore 6 of an inner diameter side of the cylindrical portion 3, a first small inner diameter sliding portion 11 is formed on the side of the bottom portion 2, a second small inner diameter sliding portion 12 is formed at the center of the bore 6, and a large inner diameter sliding portion 13 having a diameter larger than those of the first and second small inner diameter sliding portions 11 and 12 is formed on the side of the opening portion 4. Then, the sliding movement of the secondary piston 9 is guided by the first small inner diameter sliding portion 11. The sliding movement of the primary piston 8 is consistently guided by the large diameter sliding inner diameter portion 13, and is also guided by the second small inner diameter sliding portion 12 in accordance with a position of the primary piston 8.

The cylinder body 5 is integrated with two mounting pedestals 15 and 16 which protrude outward in a radial direction of the cylindrical portion 3 (hereinafter, referred to as a cylinder radial direction), specifically, upward from the cylindrical portion 3, and are formed at the same position in a circumferential direction (hereinafter, referred to as a cylinder circumferential direction) of the cylindrical portion 3 while being distant from each other in a cylinder axial direction. A reservoir R that stores an operating fluid and introduces the operating fluid into the cylinder body 5 is mounted on each of mounting holes 17 and 18 formed at the mounting pedestals 15 and 16.

In the first small inner diameter sliding portion 11 of the cylinder body 5, a plurality of, that is, two annular seal circumferential grooves 19 and 20 are sequentially formed from the side of the bottom portion 2 so that they are deviated from each other in the cylinder axial direction and are recessed outward in the cylinder radial direction. A seal ring 21 comprised of a cup seal having an E-shaped cross-sectional surface is fitted in the seal circumferential groove 19 on the side of the bottom portion 2 while its lip side is disposed on the side of the bottom portion 2. In addition, a seal ring 22 is fitted in the seal circumferential groove 20 on the side of the opening portion 4.

In the first small inner diameter sliding portion 11, an annular opening groove 23 is formed between the seal circumferential groove 19 and the seal circumferential groove 20 so as to be recessed outward in the cylinder radial direction. The opening groove 23 is opened into the mounting hole 17 on the side of the bottom portion 2, and thus the opening groove 23 communicates with a communication hole 24 that is in constant communication with the reservoir R. In addition, a bottom-side large inner diameter portion 25 having a diameter slightly larger than that of the first small inner diameter sliding portion 11 is formed on the side closer to the bottom portion 2 than the seal circumferential groove 19 of the cylinder body 5.

A middle large inner diameter portion 26 having a diameter slightly larger than those of the first and second small inner diameter sliding portions 11 and 12 of the cylinder body 5 is formed between the first and second small inner diameter sliding portions 11 and 12.

The second small inner diameter sliding portion 12 is provided with an annular seal circumferential groove 28 which is recessed outward in the cylinder radial direction. A seal ring (a check opening/closing portion) 29 comprised of a cup seal having an E-shaped cross-sectional surface is fitted in the seal circumferential groove 28 while its lip side is disposed on the side of the bottom portion 2.

An eccentric groove 30 is formed on the side of the middle large inner diameter portion 26 of the second, small inner diameter sliding portion 12 so as to connect the seal circumferential groove 28 with the middle large inner diameter portion 26 and to be recessed outward in the cylinder radial direction. The eccentric groove 30 is formed in a circular-arc shape that has a diameter smaller than that of the second small inner diameter sliding portion 12 and has an axis parallel to the second small inner diameter sliding portion 12.

An opening-side large inner diameter portion 31 having a diameter larger than those of the second small inner diameter sliding portion 12 and the large inner diameter sliding portion 13 of the cylinder body 5 and having a diameter larger than those of the bottom-side large inner diameter portion 25 and the middle large inner diameter portion 26 is formed between the second small inner diameter sliding portion 12 and the large inner diameter sliding portion 13.

In the large inner diameter sliding portion 13 of the cylinder body 5, a plurality of, that is, two annular seal circumferential grooves 32 and 33 are sequentially formed from the side of the bottom portion 2 so that they are separated from each other in the cylinder axial direction and are recessed outward in the cylinder radial direction. A seal ring 34 comprised of a cup seal having an E-shaped cross-sectional surface is fitted in the seal circumferential groove 32 on the side of the bottom portion 2 while its lip side is disposed on the side of the bottom portion 2. In addition, a seal ring 35 is fitted in the seal circumferential groove 33 on the side of the opening portion 4.

In the large inner diameter sliding portion 13, an annular opening groove 36 is formed between the seal circumferential groove 32 and the seal circumferential groove 33 so as to be recessed outward in the cylinder radial direction. The opening groove 36 is in constant communication with the reservoir R by a small diameter communication hole 37 opened into the opening groove 36 and a large diameter communication hole 38 formed to be offset from the communication hole 37 and the mounting hole 18 and opened into the mounting hole 18.

A side portion of the cylindrical portion 3 of the cylinder body 5 is provided with a secondary discharge path 40 and a primary discharge path 41 to which a brake pipe (not shown) for supplying the operating fluid to a brake caliper (not shown) is attached.

In the cylinder body 5, the bottom-side large inner diameter portion 25, the first small inner diameter sliding portion 11, the middle large inner diameter portion 26, and the second small inner diameter sliding portion 12 configure a small diameter cylinder portion 43. The opening-side large inner diameter portion 31 and the large inner diameter sliding portion 13 configure a large diameter cylinder portion 44 having a diameter larger than that of the small diameter cylinder portion 43 as a whole.

The secondary piston 9 fitted in the side of the bottom portion 2 of the cylinder body 5 is formed in a bottomed cylindrical shape that has a cylindrical portion 46 and a bottom portion 47 formed on one side of the cylindrical portion 46 in the axial direction. The secondary piston 9 is slidably fitted in the first small inner diameter sliding portion 11 of the cylinder body 5 while the cylindrical portion 46 is disposed on the side of the bottom portion 2. An end portion on the opposite side of the bottom portion 47 of the cylindrical portion 46 is provided with an annular stepped portion 49 which is slightly recessed inward in the radial direction. A plurality of ports 48 are radially formed in the annular stepped portion 49 in a manner of penetrating the annular stepped portion in the cylinder radial direction.

A portion sealed by the seal ring 21 while being surrounded by the secondary piston 9 and the bottom portion 2 of the cylinder body 5 and the side of the bottom portion 2 of the cylindrical portion 3 is formed as a secondary fluid pressure chamber (another fluid pressure chamber) 50 that supplies a fluid pressure to the secondary discharge path 40. The secondary fluid pressure chamber 50 communicates with the reservoir R when the secondary piston 9 is located at a position of opening the port 48 into the opening groove 23. In other words, the cylinder body 5 and the secondary piston 9 configure the secondary fluid pressure chamber 50.

An inner circumference of the seal ring 21 provided in the seal circumferential groove 19 on the side of the bottom portion 2 of the cylinder body 5 slidably contacts an outer circumferential side of the secondary piston 9. Accordingly, when the secondary piston 9 positions the port 48 on the side closer to the bottom portion 2 than the seal ring 21, the communication between the secondary fluid pressure chamber 50 and the reservoir R can be interrupted. At this time, when there is a difference in pressure between the reservoir R and the secondary fluid pressure chamber 50, only the stream of the operating fluid from the reservoir R to the secondary fluid pressure chamber 50 is permitted. In addition, an inner circumference of the seal ring 22 provided in the seal circumferential groove 20 of the cylinder body 5 slidably contacts the outer circumferential side of the secondary piston 9. Accordingly, the communication between the opening groove 23 communicating with the reservoir R and a primary fluid pressure chamber 51 to be described later is interrupted.

A spring assembly 57 having a coil-shaped secondary return spring 56 biasing the secondary piston 9 toward the opening portion 4 of the cylinder body 5 in an extended state is provided between the secondary piston 9 and the bottom portion 2 of the cylinder body 5 in a state of being inserted into the cylindrical portion 46.

The spring assembly 57 includes a retainer 61 that includes an axially long member 58 which comes into contact with, the bottom portion 2 of the cylinder body 5 and is long in the modal direction, an axially short member 59 which comes into contact with the bottom portion 47 of the secondary piston 9 and is short in the axial direction, and a shaft member 60 which connects a pair of members 58 and 59 to each other. The shaft member 60 slidably supports the axially long member 58 only within a predetermined range while its one end portion is fixed to the axially short member 59. The secondary return spring 56 is extendibly installed between the members 58 and 59, which are disposed both sides of the retainer 61 and connected each other so that the members 58 and 59 are relatively movable, and a maximum length of the secondary return spring 56 is controlled by the retainer 61. In the initial state where there is no input from a brake pedal (which is not shown in the drawing and located on the right of FIG. 1), a gap between the secondary piston 9 and the bottom portion 2 of the cylinder body 5 can be determined by the spring assembly 57. In addition, the secondary piston 9 slides on the inside of the cylinder body 5 by the spring assembly 57 together with the primary piston 8.

An external shape of the primary piston 8 fitted in the side of the opening portion 4 of the cylinder body 5 is formed in a stepped shape in which one axial side of the primary piston 8 is formed as a small diameter piston portion 65 and the other axial side is formed as a large diameter piston portion 66. Further, in the primary piston 8, a hole portion 70 is formed on the side of the small diameter piston portion 65 along the axial direction, and a hole portion 71 is formed on the side of the large diameter piston portion 66 along the axial direction. An annular groove 73 is formed on the side of the small diameter piston portion 65 of the large diameter piston portion 66 so as to be recessed inward in the radial direction, and a plurality of communication grooves 74 are formed on the side closer to the small diameter piston portion 65 than the annular groove 73 so as to extend along the axial direction.

The small diameter piston portion 65 of the primary piston 8 is slidably inserted into the second small inner diameter sliding portion 12 inside the small diameter cylinder portion 43 in the cylinder body 5, and the large diameter piston portion 66 thereof is slidably inserted into the large inner diameter sliding portion 13 inside the large diameter cylinder portion 44 in the cylinder body 5.

A cylindrical portion of the end portion on the opposite side of the large diameter piston portion 66 of the small diameter piston portion 65 of the primary piston 8 is provided with an annular recess portion 72 which is slightly recessed inward in the radial direction. A plurality of ports 75 are radially formed in the annular recess portion 72 in a manner of penetrating the annular recess portion 72 in the radial direction.

A portion defined by the primary piston 8 and the secondary piston 9 between the first and second small inner diameter sliding portions 11 and 12 of the cylinder body 5 and sealed by the seal rings 22 and 29 is formed as the primary fluid pressure chamber (a pressure chamber or a small diameter fluid pressure chamber) 51. The primary fluid press chamber 51 supplies a fluid pressure to the primary discharge path 41. A portion surrounded by the primary piston 8 between the second small inner diameter sliding portion 12 and the large inner diameter sliding portion 13 of the cylinder body 5 and sealed by the seal rings 29 and 34 is formed as a large diameter pressurizing chamber 76 having a diameter larger than that of the primary fluid pressure chamber 51. The primary fluid pressure chamber 51 communicates with the large diameter pressurizing chamber 76 when the primary piston 8 is located at a position of opening the port 75 into the large diameter pressurizing chamber 76.

An inner circumference of the seal ring 29 provided in the small inner diameter sliding portion 12 of the cylinder body 5 slidably contacts an outer circumferential side of the primary piston 8. Accordingly, when the primary piston 8 positions the port 75 on the side closer to the bottom portion 2 than the seal ring 29, the communication between the primary fluid pressure chamber 51 and the large diameter pressurizing chamber 76 can be interrupted. In addition, since the seal ring 29 is comprised of a cup seal, the inside of the cylinder body 5 is divided into the large diameter pressurizing chamber 76 on the side of the large diameter piston portion 66 and the primary fluid pressure chamber 51 on the side of the small diameter piston portion 65. At this time, when there is a pressure difference between the large diameter pressurizing chamber 76 and the primary fluid pressure chamber 51, only the stream of the operating fluid from the large diameter pressurizing chamber 76 to the primary fluid pressure chamber 51 is permitted.

An inner circumference of the seal ring 34 provided in the seal circumferential groove 32 slidably contacts an outer circumferential side of the large diameter piston portion 66 of the primary piston 8. Accordingly, when the primary piston 8 positions the communication groove 74 and the annular groove 73 on the side closer to the bottom portion 2 than the seal ring 34, the communication between the large diameter pressurizing chamber 76 and the communication hole 37, that is, the reservoir R, can be interrupted. Also, since the seal ring 34 is comprised of a cup seal, when there is a pressure difference between the large diameter pressurizing chamber 76 and the reservoir R, only the stream of the operating fluid from the reservoir R to the large diameter pressurizing chamber 76 is permitted via the opening groove 36 and the communication holes 37 and 38.

With the above-described configuration, when the fluid pressure of the large diameter pressurizing chamber 76 is lower than or equal to the fluid pressure of the reservoir R (atmospheric pressure), and the fluid pressure of the primary fluid pressure chamber 51 is lower than the fluid pressure of the large diameter pressurizing chamber 76, at least the seal ring 29 of the seal rings 29 and 34 opens a valve, and the operating fluid is supplied from the reservoir R to the primary fluid pressure chamber 51 of the cylinder body 5 via the mounting hole 18, the communication holes 37 and 38, and a gap formed between the large inner diameter sliding portion 13, the opening-side large inner diameter portion 31, the second small inner diameter sliding portion 12, and the primary piston 8. The mounting hole 18, the communication holes 37 and 38, and the gap between the large inner diameter sliding portion 13, the opening-side large inner diameter portion 31, the second small inner diameter sliding portion 12, and the primary piston 8 which are formed when opening the valve of at least the seal ring 29 of the seal rings 29 and 34 configure a supply pathway 85 which is formed in the cylinder body 5 to supply the operating fluid from the reservoir R to the primary fluid pressure chamber 51.

In addition, since the seal ring 35 provided in the seal circumferential groove 33 on the side of the opening portion 4 slidably contacts the large diameter piston portion 66 of the primary piston 8, the communication between the ambient air and the reservoir R, that is, the communication hole 37 via the gap between an inner circumferential side of the cylinder body 5 and an outer circumferential side of the primary piston 8 can be interrupted.

A spring assembly 79 having a coil-shaped primary return spring 78 biasing the primary piston 8 toward the opening portion 4 of the cylinder body 5 in an extended state is provided between the secondary piston 9 and the primary piston 8 in a state of being inserted into the hole portion 70.

The spring assembly 79 includes a retainer 83 that includes an axially long member 80 which comes into contact with the bottom portion 47 of the secondary piston 9 and is long in the axial direction, an axially short member 81 which comes into contact with the bottom surface of the hole portion 70 of the primary piston 8 and is short in the axial direction, and a shaft member 82 which connects the pair of members 80 and 81 each other. The shaft member 82 slidably supports the long member 80 only within a predetermined range while its one end portion is fixed to the short member 81. The primary return spring 78 is extendibly installed between the members 80 and 81, which are disposed both sides of the retainer 74 and connected each other so that the members 80 and 81 are relatively movable, and a maximum length of the primary return spring 78 is controlled by the retainer 83. In the initial state where there is no input from the brake pedal (which is not shown in the drawing and located on the right of FIG. 1), the gap between the secondary piston 9 and the primary piston 8 can be determined by the spring assembly 79.

The cylinder body 5 is formed by processing a single material in which the bottom portion 2, the cylindrical portion 3, and the mounting pedestals 15 and 16 are formed by, for example, aluminum casting.

In the initial state where there is no input from a brake pedal (not shown) as shown in FIG. 1 (where the positions of the respective members at this time are referred to as initial positions), the secondary piston 9 is located at an initial position which is farthest from the bottom portion 2 by the biasing force of the secondary return spring 56 of the spring assembly 57. At this time, the secondary piston 9 opens the port 48 into the opening groove 23. As a result, the secondary fluid pressure chamber 50 communicates with the reservoir R via a supply pathway (another supply pathway) 86 configure d by the port 48, the opening groove 23, the communication hole 24, and the mounting hole 17 so that the operating fluid can be supplied.

In this state, when the secondary piston 9 receives an input of the brake pedal via the primary piston 8 and the spring assembly 79 to be moved to the side of the bottom portion 2, the port 48 of the secondary piston 9 is blocked by the seal ring 21. As a result, the communication between the secondary fluid pressure chamber 50 and the reservoir R is interrupted. Accordingly, the operating fluid is supplied from the secondary fluid pressure chamber 50 to the brake device via the secondary discharge path 40 by a movement of the secondary piston 9 further to the side of the bottom portion 2. In addition, if the fluid pressure of the secondary fluid pressure chamber 50 becomes lower than the fluid pressure (atmospheric pressure) of the reservoir R even in a state in which the port 48 is blocked, the seal ring 21 is opened, and thus the operating fluid of the reservoir R flows into the secondary fluid pressure chamber 50.

When the primary piston 8 is positioned at the initial position which is closest to the opening portion 4 by the biasing force of the secondary return spring 56 of the spring assembly 57 and the biasing force of the primary return spring 78 of the spring assembly 79, the primary piston 8 opens the port 75 communicating with the primary fluid pressure chamber 51 so that the primary fluid pressure chamber 51 communicates with the large diameter pressurizing chamber 76.

In this state, when the primary piston 8 moves to the side of the bottom portion 2 by input of the brake pedal, the port 75 of the primary piston 8 is blocked by the seal ring 29, and thus the communication between the primary fluid pressure chamber 51 and the large diameter pressurizing chamber 76 via the port 75 is interrupted. When the primary piston 8 moves further to the side of the bottom pardon 2 in this state, the operating fluid is supplied from the primary fluid pressure chamber 51 to the brake device via the primary discharge path 41. In addition, if the fluid pressure of the large diameter pressurizing chamber 76 becomes higher than the fluid pressure of the primary fluid pressure chamber 51 even in a state in which the port 75 is blocked, the seal ring 29 is opened, and then the operating fluid of the large diameter pressurizing chamber 76 flows into the primary fluid pressure chamber 51.

When the primary piston 8 is positioned at the initial position, the primary piston 8 allows the large diameter pressurizing chamber 76 and the reservoir R to communicate with each other via a supply pathway (one of supply pathways) 87 configured by the communication groove 74, the annular groove 73, the opening groove 36, the communication holes 37 and 38, and the mounting hole 18 so that the operating fluid can be supplied. In this state, when the primary piston 8 slides to the bottom portion 2, the communication groove 74 and the annular groove 73 are blocked by the seal ring 34, so that the communication between the large diameter pressurizing chamber 76 and the reservoir R is interrupted. When the primary piston 8 further slides to the bottom portion 2, the large diameter piston portion 66 decreases the volume of the large diameter pressurizing chamber 76. Accordingly, the fluid pressure of the large diameter pressurizing chamber 76 is increased, the seal ring 29 provided between the large diameter pressurizing chamber 76 and the primary fluid pressure chamber 51 is opened, and then the operating fluid is supplied from the large diameter pressurizing chamber 76 to the primary fluid pressure chamber 51. At the time when the operating fluid is supplied to the brake device, an ineffective fluid amount at the initial stroke is replenished by performing what is referred to as a fast fill in which a large amount of the operating fluid is supplied at the initial operation, and thus the pedal stroke is shortened.

In the master cylinder 1 according to the first embodiment, the fluid pressure of the large diameter pressurizing chamber 76 needs to be released gradually with the progress of the operation of supplying the operating fluid to the primary fluid pressure chamber 51 at the time of performing the above-described fast fill. For this reason, a control valve mechanism 90 that is connected to the large diameter pressurizing chamber 76, the primary fluid pressure chamber 51, and the reservoir R, and releases the fluid pressure of the large diameter pressurizing chamber 76 into the reservoir R so as to decrease the fluid pressure thereof is assembled in the cylinder body 5. The control valve mechanism 90 releases the fluid pressure of the large diameter pressurizing chamber 76 into the reservoir R so that the fluid pressure thereof is gradually decreased in accordance with an increase in the fluid pressure of the primary fluid pressure chamber 51.

Further, in the master cylinder 1 according to the fast embodiment, a bypass pathway 91 and a cup seal 92 are immovably assembled in the cylinder body 5 in order to handle the pumping-up of a pump (not shown) of a vehicle attitude stability control system, wherein the bypass pathway 91 bypasses the supply pathway 85 formed between the cylinder body 5 and the primary piston 8 to allow the reservoir R and the primary fluid pressure chamber 51 to communicate with each other, and the cup seal 92 serves as a check valve installed in the bypass pathway 91 and opening the valve when the internal pressure of the primary fluid pressure chamber 51 is lower than the pressure of the reservoir R. In other words, the cylinder body 5 is provided with the cup seal 92 serving as a check valve that is installed in the bypass pathway 91 connecting the reservoir R and the primary fluid pressure chamber 51 to each other in a bypassing manner, so as to permit the flow of the operating fluid from the reservoir R to the primary fluid pressure chamber 51 and to interrupt the flow of the operating fluid from the primary fluid pressure chamber 51 to the reservoir R.

For this reason, the cylinder body 5 is provided with a radial protrusion portion 94 which is formed in a cylindrical shape protruding along the cylinder radial direction from the middle position of the cylinder axial direction of the cylindrical portion 3, that is, the position between two mounting pedestals 15 and 16. The radial protrusion portion 94 is also integrally formed with the bottom portion 2, the cylindrical portion 3, and the mounting pedestals 15 and 16 at the time of casting of the cylinder body 5. In addition, for the convenience of description, the radial protrusion portion 94 is formed to protrude downward vertically along the cylinder radial direction from the cylinder body 5. However, in order to form a communication hole with the reservoir R, it is desirable that the radial protrusion portion protrudes toward the left or right of a vehicle along the cylinder radial direction from the cylinder body 5.

The radial protrusion portion 94 configures a casing for assembling the control valve mechanism 90 and the cup seal 92 therein, and a radial hole 95 is formed inside the radial protrusion portion 94 from the downside thereof along the vertical direction as the cylinder radial direction. As shown in FIG. 2, the radial hole 95 includes a first hole portion 96 which communicates with the large diameter pressurizing chamber 76 by being opened into the opening-side large inner diameter portion 31, a second hole portion 97 which is formed coaxially with the first hole portion 96 and has a diameter larger than that of the first hole portion 96, a third hole portion 98 which is formed coaxially with the second hole portion 97 and has a diameter larger than that of the second hole portion 97, and a fourth hole portion 99 which is formed coaxially with the third hole portion 98 and has a diameter larger than that of the third hole portion 98, which are sequentially provided from the cylindrical portion 3. A female screw 100 is formed on the side of the fourth hole portion 99 in the third hole portion 98. Further, the radial hole 95 is opened to the outside from the opposite side of the third hole portion 98 in the fourth hole portion 99. The radial hole 95 is formed by processing the radial protrusion portion 94 from the front portion thereof in the protrusion direction by a tool.

In the cylinder body 5, as shown in FIG. 1, a communication hole 101 communicating with the primary fluid pressure chamber 51 is formed by connecting the middle large inner diameter portion 26 to an end portion on the side of the second hole portion 97 in the axial direction of the third hole portion 98 of the radial hole 95. As shown in FIG. 2, an extended line of the communication hole 101 extends to the outside from the position inside an opening portion of the radial hole 95 in the radial hole 95. The communication hole 101 is processed and formed by a tool inserted from the radial hole 95.

Further in the cylinder body 5, as shown in FIG. 1, an end portion on the side of the fast hole portion 96 in the axial direction of the second hole portion 97 of the radial hole 95 is provided with a communication hole 102 that communicates with the reservoir R by being opened into the inside of the mounting hole 18 on the side of the opening piton 4 in the cylinder body 5. An extended line of the communication hole 102 extends to the outside from the position inside the opening portion of the radial hole 95 in the radial hole 95, and the communication hole 102 in the mounting hole 18 is processed and formed by a tool inserted from the radial hole 95 or the mounting hole 18.

The opening portion side of the radial hole 95 is blocked by a cover body 105. The above-described bypass pathway 91, used for allowing the reservoir R and the primary fluid pressure chamber 51 to communicate with each other while bypassing the supply pathway 85 formed between the cylinder body 5 and the primary piston 8, is configured by a portion except for the first hole portion 96 of the radial hole 95 blocked by the cover body 105, the mounting hole 18, the communication hole 101, and the communication hole 102. An inside of the radial hole 95 of the radial protrusion portion 94 blocked by the cover body 105 configures a cylinder pathway 106 for slidably accommodating a control valve body 145 of the control valve mechanism 90 which will be described later. The cylinder pathway 106 is formed along the radial direction of the cylinder body 5, and is formed between the supply pathway 87 for permitting the communication between the reservoir R and the large diameter pressurizing chamber 76 and the supply pathway 86 for permitting the communication between the reservoir R and the secondary fluid pressure chamber 50.

Figure 2:
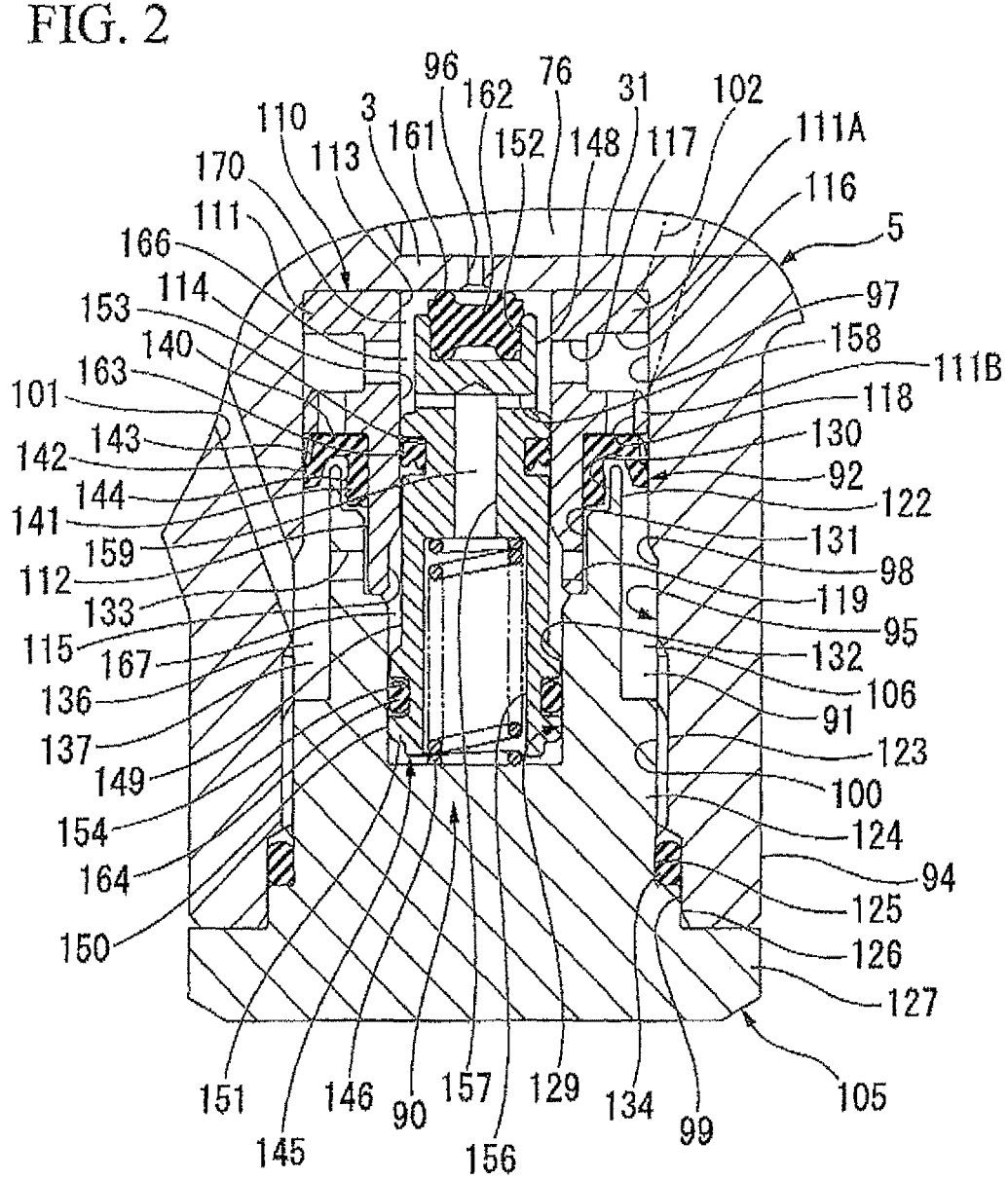
FIG. 2 is an enlarged cross-sectional view showing a main part of the master cylinder according to the first embodiment of the present invention.

As specifically shown in FIG. 2, a cylindrical guide member (retaining member) 110 is fitted into the second hole portion 97 of the radial hole 95. In other words, the guide member 110 is disposed inside the above-described bypass pathway 91. One axial side of the guide member 110 is formed as a disk-shaped portion 111 which is fitted in the second hole portion 97 to come into contact with the bottom surface of the second hole portion 97, and the other axial side is formed as a cylindrical portion 112 which has a diameter smaller than that of the disk-shaped portion 111 and is formed coaxially with the disk-shaped portion 111. A through-hole 113 is formed at the center of the guide member 110 so as to have a diameter larger than that of the first hole portion 96 and to penetrate the center in the axial direction. The through-hole 113 includes a small diameter hole portion 114 which is formed from an end portion on the side of the disk-shaped portion 111 in the axial direction to a middle position of the cylindrical portion 112, and a large diameter hole portion 115 which is formed at an end portion on the side of the cylindrical portion 112 so as to be formed coaxially with the small diameter hole portion 114 and have a diameter larger than that of the small diameter hole portion 114.

Further, a middle portion of the axial direction of the disk-shaped portion 111 is provided with an annular groove 116 which is recessed inward in the radial direction from an outer circumferential portion and is formed coaxially with the small diameter hole portion 114, and the disk-shaped portion 111 is divided into a first disk-shaped portion 111A and a second disk-shaped portion 111B. A bottom portion of the annular groove 116 is provided with a plurality of communication holes 117, each of which is formed along the radial direction of the disk-shaped portion 111 so as to allow the annular groove 116 and the small diameter hole portion 114 to communicate with each other. Further, in the disk-shaped portion 111, a plurality of communication holes 118 are formed along the axial direction of the disk-shaped portion 111 and penetrate the second disk-shaped portion 111B to go through from the annular groove 116 to the side of the cylindrical portion 112. A metallic spacer (not shown) that is a disk valve serving as a one way valve is disposed between the plurality of communication holes 118 and the cup seal 92. By the use of the spacer, the stream of the operating fluid from the cylinder pathway 106 to the reservoir R is interrupted.

Figure 3:
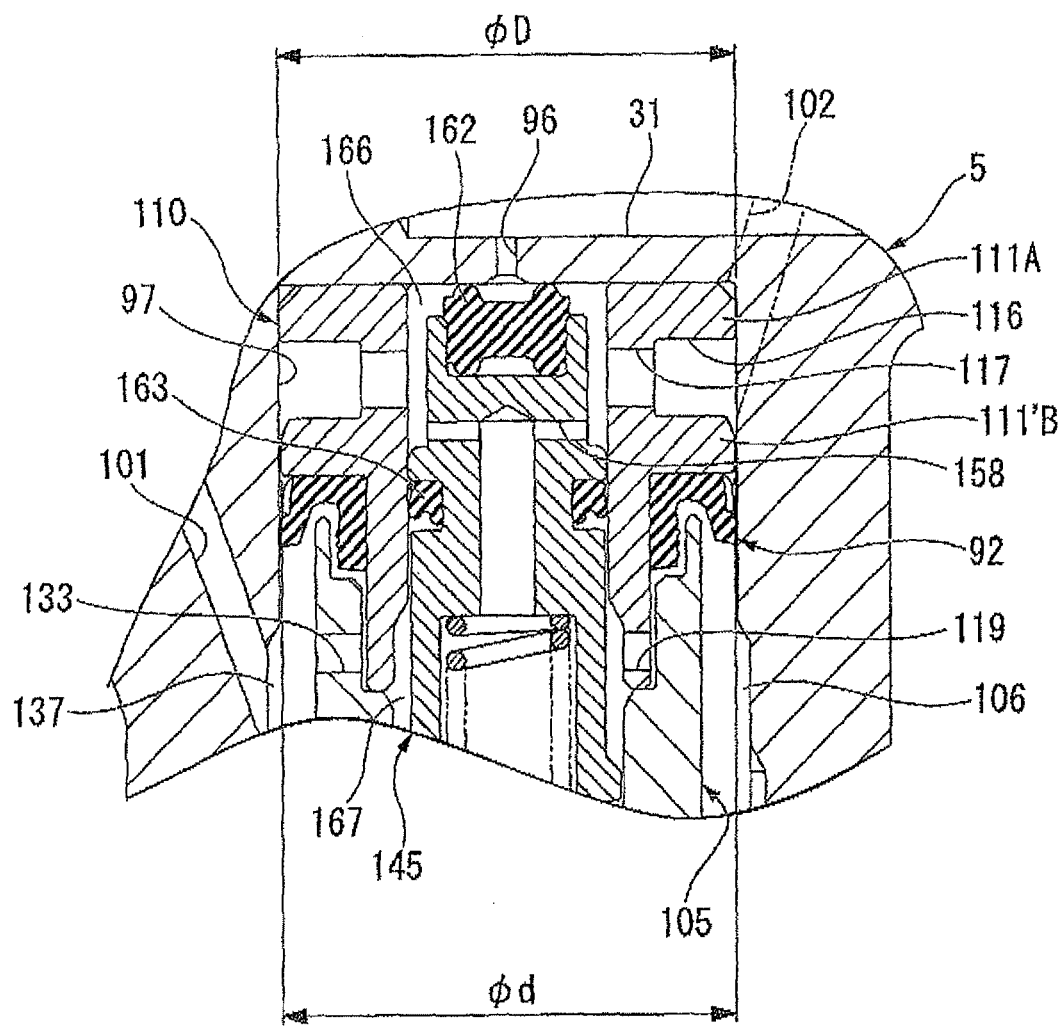
FIG. 3 is an enlarged cross-sectional view showing a main part of the master cylinder according to a modified example of the first embodiment of the present invention.

Since the spacer is needed when, the communication hole 118 is formed, the communication hole 118 and the spacer may not be provided as shown in the modified example of FIG. 3. In this case, it is preferable that an outer diameter ϕd of at least the second disk-shaped pardon 111'B of the guide member 110 is set to be smaller than an inner diameter ϕD of the second hole portion 97, and the clearance between the second disk-shaped portion 111'B and the second hole portion 97 is set to be more than or equal to 0.2 and less than or equal to 0.4 mm. In this modified example, since the communication hole 118 and the spacer shown in the first embodiment can be removed, the number of steps for processing or assembling can be decreased, and thus the manufacturing efficiency of the master cylinder is improved.

A communication hole 119 formed along the radial direction of the cylindrical portion 112 is provided at the position of the large diameter hole portion 115 of the cylindrical portion 112 of the guide member 110. In addition, when the disk-shaped portion 111 of the guide member 110 comes into contact with the bottom surface of the second hole portion 97, an axial position of the annular groove 116 is aligned with en opening position of the second hole portion 97 of the communication hole 102. Further, an opening range of the communication hole 102 with respect to the second hole portion 97 is within the range of the disk-shaped portion 111 of the guide member 110.

The radial hole 95 is blocked by the above-described cover body 105 configuring the casing together with the radial protrusion portion 94. An external shape of the cover body 105 is a stepped shape that includes a front end shaft-shaped portion 122, a screw shaft portion 124 which has a diameter larger than that of the front end shaft-shaped portion 122 and has a male screw 123 formed thereon, a shaft-shaped portion 125 which has a diameter larger than that of the front end shaft-shaped portion 122 and slightly smaller than that of the screw shaft portion 124, a shaft-shaped portion 126 which has a diameter larger than those of the screw shaft portion 124 and the shaft-shaped portion 125, and a contact-plate-shaped portion 127 which has a diameter larger than that of the shaft-shaped portion 126, wherein these portions are formed on the same axis, and are sequentially formed from one axial end of the cover body 105.

In the cover body 105, a cover body hole 129 is formed at the center on the opposite side of the contact-plate-shaped portion 127. The cover body hole 129 includes a first hole portion 130 which is formed at an end portion on the opposite side of the contact-plate-shaped portion 127 of the front end shaft-shaped portion 122 and has a large diameter, a second hole portion 131 which is formed coaxially with the first hole portion 130, is formed from the bottom surface of the first hole portion 130 to the contact plate-shaped portion 127, and has a small diameter, and a third hole portion 132 which is formed coaxially with the second hole portion 131, is formed from the bottom surface of the second hole portion 131 to the contact-plate-shaped portion 127, and has a small diameter. A communication hole 133 is formed at the position of the second hole portion 131 in the front end shaft-shaped portion 122 so as to penetrate the front end shaft-shaped portion 122 in the radial direction. In addition, the third hole portion 132 is formed coaxially with the large diameter hole portion 115 of the guide member 110 and has the same diameter as the large diameter hole portion 115. Accordingly, the third hole portion 132 has a diameter larger than that of the small diameter hole portion 114.

When the cover body 105 is threaded into the female screw 100 of the radial hole 95 with the male screw 123 formed on the screw shaft portion 124, an end surface on the side of the shaft-shaped portion 126 of the contact-plate-shaped portion 127 comes into contact with a front end surface of the radial protrusion portion 94, and an end surface on the opposite side of the disk-shaped portion 111 of the cylindrical portion 112 of the guide member 110 comes into contact with a bottom surface of the second hole portion 131. Accordingly, the guide member 110 is fixed to the radial protrusion portion 94 by the cover body 105 while being disposed coaxially with the radial hole 95 and the cover body 105. In this state, a seal ring 134 for sealing a gap between the radial protrusion portion 94 and the cover body 105 is disposed between the fourth hole portion 99 of the radial hole 95 and the shaft-shaped portion 125 of the cover body 105 on the outside of the threading position between the female screw 100 and the male screw 123.

While the cover body 105 is threaded into the radial protrusion portion 94 as described above, the cylindrical portion 112 of the guide member 110 fined into the radial protrusion portion 94 is disposed inside the second hole portion 131 of the cover body 105 with a radial gap interposed therebetween. Further, in this state, the annular groove 116 of the guide member 110 communicates with the communication hole 102 as described above, and a chamber 136 of a portion between the second hole portion 97 and the third hole portion 98 of the radial protrusion portion 94, the side of the cylindrical portion 112 of the disk-shaped portion 111 and the cylindrical portion 112 of the guide member 110, and the side of the front end shaft-shaped portion 122 of the cover body 105 communicates with the communication hole 101 via the annular groove 116 and the communication hole 118. Accordingly, the chamber 136 formed by the cover body 105 and the guide member 110 inside the bypass pathway 91 and the communication hole 118 and the annular groove 116 of the guide member 110 disposed inside the bypass pathway 91 configures a communication path 137 that allows the reservoir R and the primary fluid pressure chamber 51 to communicate with each other via the mounting hole 18, the communication hole 102, and the communication hole 101. In addition, the communication hole 133 of the cover body 105 is also included in the chamber 136.

The cup seal 92 retained by the guide member 110 provided inside the bypass pathway 91 is provided inside the chamber 136 configuring the communication path 137 of the bypass pathway 91. The cup seal 92 includes an annular-disk-shaped base portion 140, an inner circumferential lip portion 141 having a substantially cylindrical shape which extends toward one axial side from an inner circumferential edge portion of the base portion 140, and an outer circumferential lip portion 142 having a substantially tapered cylindrical shape of which the diameter increases toward the extended front end side which extends toward the same side as the inner circumferential lip portion 141 from an outer circumferential edge portion of the base portion 140. In the cup seal 92, an end surface on the opposite side of the outer circumferential lip portion 142 in the axial direction of the base portion 140 is provided with a plurality of pathway grooves 143 which are formed in the circumferential direction with an interval therebetween so as to be recessed in the axial direction and penetrate that portion in the radial direction, and to extend from the end surface to the halfway position in the axial direction of an outer circumferential surface of the outer circumferential lip portion 142 while being recessed inward in the radial direction. In addition, an unevenness portion 144 having an uneven shape in the axial direction is formed throughout the entire circumference of an outer circumferential surface of the inner circumferential lip portion 141.

The our circumferential lip portion 142 of the cup seal 92 is adapted to be tilted with respect to the base portion 140, and thus the radial thickness of the outer circumferential lip portion 142 is thinner than that of the inner circumferential lip portion 141.

The base portion 140 of the cup seal 92 is disposed between the cover body 105 and the disk-shaped portion 111 of the guide member 110. In addition, the inner circumferential lip portion 141 is fitted in the cylindrical portion 112 of the guide member 110 so as to adhere thereon in the inner circumferential lip portion 141 while being disposed inside in the radial direction of the first hole portion 130 of the cover body 105. At this time, the base portion 140 of the cup seal 92 can form an axial gap with respect to the front end shaft-shaped portion 122 of the cover body 105, and thus the inner circumferential lip portion 141 can form radial and axial gaps with respect to the first hole portion 130 of the cover body 105. In addition, the outer circumferential lip portion 142 of the cup seal 92 is disposed between the second hole portion 97 of the radial hole 95 and the front end shaft-shaped portion 122 of the cover body 105, and contacts an inner circumferential surface of the second hole portion 97 of the radial hole 95 configuring an inner circumferential surface of the communication hole 137 of the bypass path 91 in a natural state. In this state, the outer circumferential lip portion 142 forms a radial gap with respect to the front end shalt-shaped portion 122 of the cover body 105. Then, when the outer circumferential lip portion 142 is bent toward toe front end shaft-shaped portion 122 by an amount corresponding to the radial gap, the outer circumferential lip portion 142 is separated from the inner circumferential surface of the second hole portion 97. That is, the outer circumferential lip portion 142 is movable to or from the second hole portion 97 configuring the inner circumferential surface of the communication path 137.

The flow of the operating fluid from the reservoir R to the primary fluid pressure chamber 51 via the communication path 137 is permitted by the cup seal 92 in a manner that the outer circumferential lip portion 142 is bent to be away from the second hole portion 97, and the flow of the operating fluid in the reverse direction is interrupted in a manner that the outer circumferential lip portion 142 comes into contact with the second hole portion 97. That is, when the fluid pressure of the primary fluid pressure chamber 51 is equal to or more than the fluid pressure (atmospheric pressure) of the reservoir R, the outer circumferential lip portion 142 of the cup seal 92 blocks the communication path 137 by being brought into contact with the inner circumferential surface of the communication path 137, so that the low of the operating fluid from the primary fluid pressure chamber 51 to the reservoir R via the bypass pathway 91 including the communication path 137 is controlled. On the other hand, when the fluid pressure of the primary fluid pressure chamber 51 becomes lower than the fluid pressure (atmospheric pressure) of the reservoir R, the outer circumferential lip portion 142 of the cup seal 92 is bent to be away from the inner circumferential surface of the communication path 137 due to a difference in fluid pressure so as to open the communication path 137, so that the flow of the operating fluid from the reservoir R to the primary fluid pressure chamber 51 via the bypass pathway 91 including the communication path 137 is permitted. Such an operation of the cup seal 92 is reliably performed because the radial thickness of the outer circumferential lip portion 142 is thinner than that of the inner circumferential lip portion 141 as described above.

The control valve body 145 reciprocating along the axial direction of the cover body 105 and the guide member 110 is slidably accommodated inside the third hole portion 132 of the cover body 105 and inside a through hole 113 of the guide member 110 in the cylinder pathway 106, and a valve spring 146 for biasing the control valve body 145 toward the cylindrical portion 3 of the cylinder body 5 is also accommodated therein. The control valve body 145 and the valve spring 146 configure the control valve mechanism 90.

The control valve body 145 includes a piston member 151 that has a first shaft portion 148, a second shaft portion 149 which is formed coaxially with the first shaft portion 148 and has a diameter larger than that of the first shaft portion 148, and a third shaft portion 150 which is formed coaxially with the second shaft portion 149 and has a diameter larger than that of the second shaft portion 149, which are sequentially provided from one side in the axial direction. A fitting recess portion 152 is formed coaxially at the center of the radial direction of the front end of the first shaft portion 148 of the piston member 151 so as to be recessed in the axial direction and have a circular cross-sectional surface perpendicular to the axis. An annular seal groove 153 is formed coaxially at an outer circumferential portion on the side of the first shaft portion 148 of the second shaft portion 149 so as to be recessed inward in the radial direction. Also, an annular seal groove 154 is formed coaxially at an outer circumferential portion of the third shaft portion 150 so as to be recessed inward in the radial direction.

The piston member 151 is provided with a first hole portion 156 which is formed on the side of the third shaft portion 130 along the axial direction, a second hole portion 157 which is formed from the bottom portion of the first hole portion 156 to a portion before the fitting recess portion 152 to be coaxial with the first hole portion 156, and has a diameter smaller than that of the first hole portion 156, and a perpendicular hole portion 158 which is formed form from the position of the end portion on the opposite side of the first hole portion 156 of the second hole portion 157 in the radial direction so as to be perpendicular to the second hole portion 157. The first hole portion 156, the second hole portion 157, and the perpendicular hole portion 158 configure an internal pathway 159 of which one end side is opened into the end portion on the opposite side of the fitting recess portion 152 of the piston member 151, and the other end side is opened into an outer diameter surface of the first shaft portion 148 on the side of the second shaft portion 149. The second shaft portion 149 of the piston member 151 is slidably fitted in the small diameter hole portion 114 of the guide member 110, and the third shaft portion 150 is slidably fitted in an inner circumferential surface of the third hole portion 132 of the cover body 105.

The control valve body 145 includes a seal member 162 which is fitted in the fitting recess portion 152, and can block the first hole portion 96 by allowing an annular protrusion portion 161 of the front end thereof to contact the bottom surface of the second hole portion 97 of the radial hole 95 of the piston member 151, a seal ring 163 which is fitted in the seal groove 153 of the second shaft portion 149, and constantly seals a gap between the small diameter hole portion 114 of the guide member 110 and the second shaft portion 149, and a seal ring 164 which is fitted in the third shaft portion 150, and constantly seals a gap between the third hole portion 132 of the cover body 105 and the third shaft portion 150.

The valve spring 146 is a coil spring having a constant diameter. The valve spring 146 is inserted inside the first hole portion 156 of the piston member 151, and comes into contact with the bottom surface of the third hole portion 132 of the cover body 105 and the bottom surface of the first hole portion 156 so as to bias the control valve body 145 in a direction in which the seal member 162 and the first hole portion 96 are blocked.

In the above-described cylinder pathway 106, a portion between the small diameter hole portion 113 of the guide member 110, the bottom surface of the second hole portion 97 of the radial hole 95, and the control valve body 145 configure a control valve chamber 166. The control valve chamber 166 is in constant communication with the reservoir R via the communication hole 102 of the cylinder body 5 and the annular groove 116 and the communication hole 117 of the guide member 110, and can communicate with the large diameter pressurizing chamber 76 via the first hole portion 96 of the radial hole 95. Here, the communicating/blocking operation with respect to the large diameter pressurizing chamber 76 is performed by the control valve body 145.

In the cylinder pathway 106, a portion between the control valve body 145, the large diameter hole portion 115 of the guide member 110, and the third hole portion 132 of the cover body 105 configure a small diameter pressure chamber 167. The small diameter pressure chamber 167 communicates with the primary fluid pressure chamber 51 via the communication hole 101 of the cylinder body 5, the chamber 136 between the radial hole 95, the cover body 105, the cup seal 92, and the guide member 110, and the communication hole 119 of the guide member 110, and applies the fluid pressure of the primary fluid pressure chamber 51 to the control valve body 145. The fluid pressure of the primary fluid pressure chamber 51 introduced into the small diameter pressure chamber 167 acts on the seal portion sealed by the large diameter seal ring 164 of the control valve body 145 and the seal portion sealed by the small diameter seal ring 163, and thus a thrust force is generated in the control valve body 145 due to a difference in the pressure receiving area.

As described above, the cup seal 92 is disposed inside the chamber 136 of the cylinder pathway 106, and defines the control valve chamber 166 communicating with the chamber 136 via, the annular groove 116, the communication hole 117 and the communication hole 118 of the guide member 110 and the small diameter pressure chamber 167 communicating with the chamber 136 via the communication hole 119 of the guide member 110. Also, the cup seal 92 permits the flow of the operating fluid from the control valve chamber 166 to the small diameter pressure chamber 167 by bending the outer circumferential lip portion 142, and interrupts the flow of the operating fluid in the reverse direction.

While the control valve body 145 of the control valve mechanism 90 is separated from the bottom surface of the second hole portion 97 of the radial hole 95, the large diameter pressurizing chamber 76 communicates with the reservoir R via the first hole portion 96 of the radial hole 95, the control valve chamber 166, the communication hole 117 and the annular groove 116 of the guide member 110, the communication hole 102, and the mounting hole 18. An opening pathway 170 is formed by letting the large diameter pressurizing chamber 76 communicates with the reservoir R via the first hole portion 96, the control valve chamber 166, the communication hole 117 and the annular groove 116 of the guide member 110, the communication hole 102, and the mounting hole 18, so as to release the fluid pressure of the large diameter pressurizing chamber 76 to the reservoir R via the control valve mechanism 90.

When the fluid pressure of the primary fluid pressure chamber 51 is more than or equal to the fluid pressure (atmospheric pressure) of the reservoir R, the outer circumferential lip portion 142 of the cup seal 92 serving as a check valve is inclined by an obtuse angle with respect to the base portion 140 to thereby contact the inner circumferential surface of the second hole portion 97 configuring the chamber 136 in the communication path 137 configured by the mounting hole 18, the communication hole 102, the annular groove 116 and the communication hole 118 of the guide member 110, the chamber 136, and the communication hole 101. Then, since the inner circumferential lip portion 141 blocks the gap with respect to the cylindrical portion 112 of the guide member 110 configuring the communication path 137 while facing the inner circumferential surface of the second hole portion 97, the cup seal 92 closes the communication path 137. Accordingly, the flow of the operating fluid from the primary fluid pressure chamber 51 to the reservoir R via the communication path 137 is interrupted, and the flow of the operating fluid to the control valve chamber 166 is also interrupted. On the other hand, when the fluid pressure of the primary fluid pressure chamber 51 becomes lower than the fluid pressure of the reservoir R (atmospheric pressure), the outer circumferential lip portion 142 of the cup seal 92 is bent so as to be substantially perpendicular to the base portion 140, and is separated from the inner circumferential surface of the second hole portion 97 configuring the communication path 137 due to a difference in fluid pressure to thereby open the communication path 137. Accordingly, the flow of the operating fluid from the reservoir R to the primary fluid pressure chamber 51 via the bypass pathway 91 is permitted. At this time, the operating fluid passing through the communication hole 118 of the guide member 110 flows to the side of the outer circumferential lip portion 142 between the cup seal 92 and the disk-shaped portion 111 mainly via the pathway groove 143 of the cup seal 92, and passes through a gap between the outer circumferential lip portion 142 and the second hole portion 97, thereby passing through a portion where the cup seal 92 is disposed in the communication path 137.

With the above-described configuration, when the operating fluid of the primary fluid pressure chamber 51 is pumped up by a pump (not shown) of the vehicle attitude stability control system, the primary fluid pressure chamber 51 enters a negative pressure state due to the suction pressure. Then, the cup seal 92 is bent as described above to open the valve, and a larger amount of the operating fluid flows from the reservoir R to the primary fluid pressure chamber 51 via the communication path 137 compared to the operating fluid flowing via the supply path 85 formed between the cylinder body 5 and the primary piston 8 and entering a communication state by operating the valve of the seal ring 29, thereby a large amount of the operating fluid can be flowed through the supply path 85 and the communication path 137.

The small diameter pressure chamber 167 of the control valve mechanism 90 is in constant communication with the primary fluid pressure chamber 51 via the communication hole 101, the chamber 136, and the communication hole 119 of the guide member 110. As a result, a thrust force, that is, a valve-opening-direction thrust force against the biasing force of the valve spring 146, is generated in the control valve body 145 due to the fluid pressure of the primary fluid press chamber 51 and a difference in the pressure receiving area of the seal rings 163 and 144. Accordingly, when the control valve body 145 moves against the biasing force of the valve spring 146, the opening pathway 170 including the first hole portion 96 is opened, so that the fluid pressure of the large diameter pressurizing chamber 76 communicating via the first hole portion 96 of the opening pathway 170 is released to the reservoir R via the opening pathway 170. Here, the thrust force generated in the control valve body 145 is changed in accordance with the fluid pressure of the primary fluid pressure chamber 51 introduced into the small diameter pressure chamber 167. As a result, the control valve body 145 releases the fluid pressure of the large diameter pressurizing chamber 76 to the reservoir R so that the fluid pressure thereof is gradually decreased in accordance with an increase in the fluid pressure of the primary fluid pressure chamber 51.

That is, at the above-described fast fill, the seal ring 29 is pushed to be opened, and the operating fluid is transferred from the large diameter pressurizing chamber 76 to the primary fluid pressure chamber 51 via a gap between the cylinder body 5 and the primary piston 8 as a part of the supply pathway 85 so as to replenish the ineffective fluid amount (an amount of rollback of a caliper piston caused by a seal disposed on the brake caliper) at the initial stroke. Subsequently, the operating fluid is transferred from the large diameter pressurizing chamber 76 to the primary fluid pressure chamber 51 via the gap between the cylinder body 5 and the primary piston 8 in order to replenish an insufficient fluid amount with a decrease in the diameter of the primary fluid pressure chamber 51, and thus the fluid pressures of the large diameter pressurizing chamber 76 and the primary fluid pressure chamber 51 similarly increase up to the pressurizing chamber releasing fluid pressure. And then, when the fluid pressure increases to the pressurizing chamber releasing fluid pressure, the control valve body 145 of the control valve mechanism 90 which has been in a closed state is opened, and the fluid pressure of the large diameter pressurizing chamber 76 is released to the reservoir R via the opening pathway 170, thereby the fluid pressure of the large diameter pressurizing chamber 76 is released. At this time, the control valve mechanism 90 releases the fluid pressure of the large diameter pressurizing chamber 76 to the reservoir R such that the fluid pressure of the large diameter pressurizing chamber 76 is gradually decreased in accordance with an increase in the fluid pressure of the primary fluid pressure chamber 51. For this reason, the brake feeling can be improved by reducing the pedal's loose sensation caused by the release of the fluid pressure of the large diameter pressurizing chamber 76 when operating the brake pedal.

Here, according to the master cylinder disclosed in JP-A-2008-230283, in order to allow a relatively large amount of the operating fluid to flow by the suction from the downstream side, the cylinder body is provided with the bypass pathway allowing the reservoir to communicate with the fluid pressure chamber inside the cylinder body in addition to the pathway configured by the gap between the cylinder body and the piston, and the bypass pathway retains a check valve body that is slidable in accordance with a decrease in the fluid pressure of the fluid pressure chamber. For this reason, a structure allowing the operating fluid to smoothly flow by the suction from the downstream side becomes large in size and causes an increase in cost, which results in a problem of an increase in the size and cost of the entire structure of the master cylinder.

On the other hand, according to the master cylinder 1 of the first embodiment, the cup seal 92 is installed as the check valve in the bypass pathway 91 so as to open the valve when the pressure inside the primary fluid pressure chamber 51 is lower than the pressure of the reservoir R. The cup seal 92 permits the flow of the operating fluid from the reservoir R to the primary fluid pressure chamber 51 in such a manner that the outer circumferential lip portion 142 is bent to be separated from the inner circumferential surface of the second hole portion 97 configuring the communication path 137 of the bypass pathway 91. On the other hand, the cup seal 92 interrupts the flow of the operate fluid in the reverse direction in such a manner that the outer circumferential lip portion 142 comes into contact with the inner circumferential surface of the second hole portion 97. For this reason, the operating fluid of the reservoir R can be made to smoothly flow by the suction from the downstream side while suppressing an increase in the size and cost of the master cylinder. Accordingly, the operation of the vehicle attitude stability control system is accurately performed.

Further, in the master cylinder 1 of the first embodiment, the stepped cylinder body 5 and the stepped primary piston 8 are used, and the large diameter pressurizing chamber 76 having a diameter larger than that of the primary fluid pressure chamber 51 is formed. In addition, the control valve mechanism 90 is provided which performs the fast fill in such a manner that the seal ring 29 is pushed and opened to supply the operating fluid from the large diameter pressurizing chamber 76 to the primary fluid pressure chamber 51, and which releases the fluid pressure of the large diameter pressurizing chamber 76 to the reservoir R so that the fluid pressure thereof is decreased after the fast fill. Since the cup seal 92 is provided inside the control valve mechanism 90, it is possible to effectively suppress an increase in the size and cost of the master cylinder.

Specifically, the above-described cup seal 92 is provided inside the cylinder pathway 106 accommodating the control valve body 145 of the control valve mechanism 90 so as to define the control valve chamber 166 for performing the communicating/blocking operation with the large diameter pressurizing chamber 76 using the control valve body 145 and the small diameter pressure chamber 167 allowing the fluid pressure of the primary fluid pressure chamber 51 to act on the control valve body 145. Since the cup seal 92 permits the flow of the operating fluid from the control valve chamber 166 to the small diameter pressure chamber 167 by bending the outer circumferential lip portion 142 and interrupts the flow of the operating fluid in the reverse direction, the operating fluid is made to flow from the control valve chamber 166 which is constantly communicating with the reservoir R of the control valve mechanism 90 to the small diameter pressure chamber 167 which is constantly communicating with the primary fluid pressure chamber 51. Accordingly, the pathway of the control valve mechanism 90 can also be used as the fluid supply pathway during pumping-up.

In addition, the cup seal 92 includes the inner circumferential lip portion 141 and the outer circumferential lip portion 142 extending from the base portion 140, and the outer circumferential lip portion 142 is inclinable with respect to the base portion 140. Accordingly, the operating fluid can be made to flow satisfactorily when the valve is opened.

Further, since the radial thickness of the outer circumferential lip portion 142 is thinner than that of the inner circumferential lip portion 141, the cup seal 92 can reliably open or close the valve while having good response characteristics with respect to a variation in fluid pressure.

Furthermore, since the cup seal 92 is retained in the bypass pathway 91 by the guide member 110 provided inside the bypass pathway 91, the cup seal 92 can be assembled in the cylinder body 5 in the state where the cup seal 92 is retained in advance in the guide member 110 separated from the cylinder body 5, which facilitates the assembling of the master cylinder.

Moreover, since the cylinder pathway 106 is formed along the radial direction of the cylinder body 5, the processing of the communication hole with respect to the reservoir R or the primary fluid pressure chamber 51 is easily performed, and thus the manufacturing efficiency of the master cylinder can be improved.

Further, the slidable secondary piston 9 is provided inside the cylinder body 5 together with the primary piston 8, the secondary piston 9 and the small diameter cylinder portion 43 configure the secondary fluid pressure chamber 50, and the cylinder pathway 106 is formed between the supply pathway 87 allowing the reservoir R to communicate with the large diameter pressurizing chamber 76 and the supply pathway 86 allowing the reservoir R to communicate with the secondary fluid pressure chamber 50. Accordingly, the communication hole 102 allowing the cylinder pathway 106 to communicate with the reservoir R can be easily formed while avoiding the interferences of the supply paths 86 and 87. For this reason, the manufacturing efficiency of the master cylinder can be improved.

Second Embodiment

Figure 4:
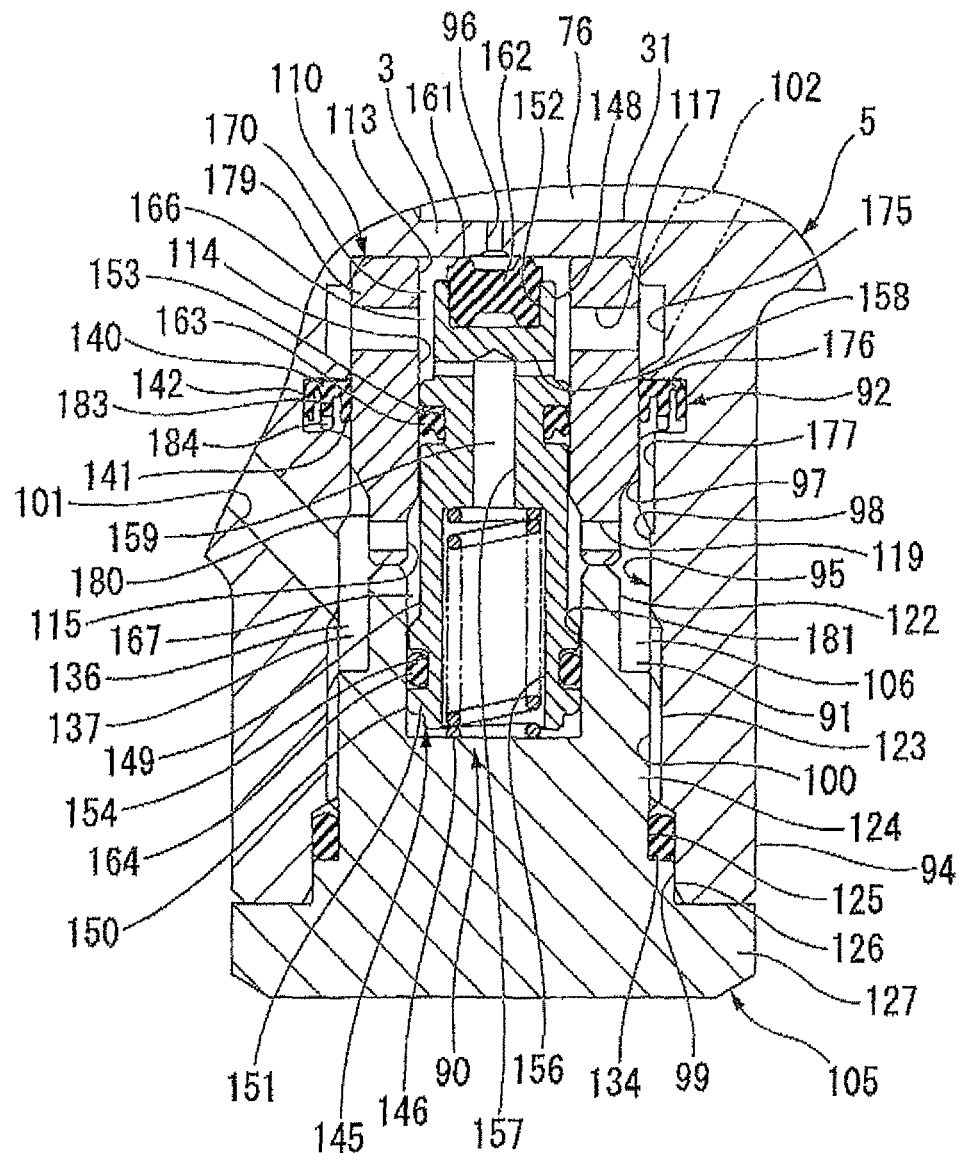
FIG. 4 is an enlarged cross-sectional view showing a main part of a master cylinder according to a second embodiment of the present invention.

Next, a second embodiment of the present invention will be described mainly based on differences between the second embodiment and the first embodiment with reference to FIG. 4. In addition, the same designations and reference numerals will be given to the same components as those of the first embodiment.

In the second embodiment, a part of the configuration of the radial hole 95 is different from that of the first embodiment. That is, in the radial hole 95, an annular pathway groove 175 is formed coaxial with the second hole portion 97 on the side of the first hole portion 96 of the inner circumferential surface of the second hole portion 97 so as to be recessed outward in the radial direction, and an annular groove 176 is formed coaxial with the annular groove 176 on the side closer to the third hole portion 98 than the pathway groove 175 of the second hole portion 97 so as to be recessed outward in the radial direction. In addition, an axial groove 177 is formed on the side closer to the third hole portion 98 than the annular groove 176 of the second hole portion 97 so as to be recessed outward in the radial direction and to extend along the axial direction from the annular groove 176 to the third hole portion 98. Further, the communication hole 102 is opened into the pathway groove 175.

Further, in the second embodiment, a part of the configuration of the guide member 110 is different from that of the first embodiment. The guide member 110 includes a first cylindrical portion 179 which is fitted in the second hole portion 97 of the radial hole 95, and a second cylindrical portion 180 which is formed coaxially on one axial end side of the first cylindrical portion 179 and is short in the axial direction, where an outer diameter of the second cylindrical portion 180 is smaller than that of the first cylindrical portion 179, and an inner diameter is larger than that of the first cylindrical portion 179. In the through hole 113 of the guide member 110, the inside of the first cylindrical portion 179 configures the small diameter hole portion 114, and the inside of the second cylindrical portion 180 configures the large diameter hole portion 115 having a diameter larger than that of the small diameter hole portion 114. The communication hole 117 is formed on the opposite side of the second cylindrical portion 180 of the first cylindrical portion 179 to penetrate the first cylindrical portion 179 in the radial direction, and the communication hole 119 is formed in the second cylindrical portion 180 to penetrate the second cylindrical portion 180 in the radial direction. In addition, when the first cylindrical portion 179 of the guide member 110 comes into contact with the bottom surface of the second hole portion 97, the communication hole 117 of the second hole portion 97 is disposed within the range of the pathway groove 175 of the second hole portion 97 along the axial direction.

In the second embodiment, a part of the configuration of the cover body 105 is different from that of the first embodiment. In the cover body 105, a hole portion 181 having a constant diameter is formed from the front end shaft-shaped portion 122 to the halfway position of the screw shaft portion 124. In addition, the cover body 105 is not provided with a communication hole penetrating the cover body 105 in the radial direction. The hole portion 181 is formed coaxially with the large diameter hole portion 115 of the guide member 110 so as to have the same diameter, and thus the hole portion 181 has a diameter larger than that of the small diameter hole portion 114.

When the male screw 123 formed on the screw shaft portion 124 of the cover body 105 is threaded into the female screw 100 of the radial hole 95, an end surface on the side of the shaft-shaped portion 126 of the contact-plate-shaped portion 127 comes into contact with a front end surface of the radial protrusion portion 94, and an end surface on the opposite side of the first cylindrical portion 179 of the second cylindrical portion 180 of the guide member 110 comes into contact with an end surface on the opposite side of the screw shaft portion 124 of the front end shaft-shaped portion 122. Accordingly, the guide member 110 is fixed to the radial protrusion portion 94 by the cover body 105 while being disposed coaxially with the radial hole 95 and the cover body 105.

Here, while the cover body 105 is threaded into the radial protrusion portion 94, the communication hole 117 of the guide member 110 communicates with the pathway groove 175 as described above. In addition, the chamber 136 is formed in a portion between the side of the third hole portion 98 from the annular groove 176 of the second hole portion 97 of the radial protrusion portion 94, the third hole portion 98, the guide member 110, and the side of the front end shaft-shaped portion 122 of the cover body 105, and then the chamber 136 communicates with the communication hole 101. The pathway groove 175 can communicate with the chamber 136 via the annular groove 176 and the axial groove 177, and thus the pathway groove 175, the annular groove 176 and the axial groove 177 of the radial protrusion portion 94, and the chamber 136 configure the communication path 137 of the bypass pathway 91 allowing the reservoir R to communicate with the primary fluid pressure fiber 51 via the mounting hole 18, the communication hole 102, and the communication hole 101.

The annular groove 176 is formed in the second hole portion 97 of the radial hole 95, thereby the annular groove 176 is formed in an inner circumferential surface of the cylinder pathway 106 slidably accommodating the control valve body 145.

In the second embodiment, the cup seal 92 having a configuration partly different from that of the first embodiment is provided in the annular groove 176. The cup seal 92 of the second embodiment includes a substantially cylindrical middle protrusion portion 183 that extends from the radial middle portion of the annular-disk-shaped base portion 140 toward the same side as those of the inner circumferential lip portion 141 and the outer circumferential lip portion 142.

That is, the middle protrusion portion 183 is provided between the outer circumferential lip portion 142 and the inner circumferential lip portion 141. Here, the middle protrusion portion 183 protrudes more toward the opposite side of the base portion 140 than the inner circumferential lip portion 141 and the outer circumferential lip portion 142. A front end portion of the middle protrusion portion 183 is provided with a plurality of notch grooves 184 that are recessed in the axial direction and penetrate the middle protrusion portion 183 in the radial direction.

The outer circumferential lip portion 142 of the cup seal 92 of the second embodiment is also inclinable with respect to the base portion 140, and the radial thickness of the outer circumferential lip portion 142 is thinner than those of the inner circumferential lip portion 141 and the middle protrusion portion 183.

The base portion 140 of the cup seal 92 faces the side of the pathway groove 175 of the annular groove 176, the middle protrusion portion 183 thereof is disposed inside the annular groove 176 so as to come into contact with the surface on the opposite side of the pathway groove 175 of the annular groove 176, and the cup seal 92 is fitted while the inner circumferential lip portion 141 comes into close contact with the first cylindrical portion 179 of the guide member 110. In this state, the inner circumferential lip portion 141 and the outer circumferential lip portion 142 are separated from the surface on the opposite side of the pathway groove 175 of the annular groove 176, and the side of the base portion 140 of the outer circumferential lip portion 142 and the base portion 140 are separated from a groove bottom surface of the annular groove 176. In addition, the cup seal 92 comes into contact with a groove bottom surface of the annular groove 176 configuring the inner circumferential surface of the communication path 137 of the bypass pathway 91 when the outer circumferential lip portion 142 is in a natural state. When the outer circumferential lip portion 142 is bent toward the middle protrusion portion 183 in this state, the outer circumferential lip portion 142 is separated from the groove bottom surface of the annular groove 176. That is, the outer circumferential lip portion 142 is movable to or from the groove bottom surface of the annular groove 176 configuring the inner circumferential surface of the communication path 137.

The cup seal 92 of the second embodiment permits the flow of the operating fluid from the reservoir R to the primary fluid pressure chamber 51 via the communication path 137 in such a manner that the outer circumferential lip portion 142 is bent to be away from the groove bottom surface of the annular groove 176 configuring the inner circumferential surface of the communication path 137, and interrupts the flow of the operating fluid in the reverse direction in such a manner that the outer circumferential lip portion 142 comes into contact with the groove bottom surface of the annular groove 176.

In the second embodiment, the control valve body 145 having the same configuration as that of the first embodiment and reciprocating vertically along the axial direction of the cover body 105 and the guide member 110 is slidably accommodated inside the hole portion 181 of the cover body 105 and inside the through hole 113 of the guide member 110. Also, the valve spring 146 having the same configuration as that of the first embodiment and biasing the control valve body 145 toward the cylindrical portion 3 of the cylinder body 5 is accommodated therein.

In the control valve body 145, the seal ring 163 and the second shaft portion 149 of the piston member 151 are slidably fitted in the small diameter hole portion 114 of the guide member 110, and the seal ring 164 and the third shaft portion 150 of the piston member 151 are slidably fitted in an inner circumferential surface of the hole portion 181 of the cover body 105.

The valve spring 146 is inserted into the first hole portion 156 of the piston member 151, and comes into contact with the bottom surface of the first hole portion 156 and the bottom surface of the hole portion 181 of the cover body 105 so as to bias the control valve body 145 in a direction in which the first hole portion 96 is blocked by the seal member 162.

The control valve chamber 166 of a portion between the small diameter hole portion 94 of the guide member 110 the bottom surface of the second hole portion 97 of the radial hole 95, and the control valve body 145 are in constant communication with the reservoir R via the communication hole 102 of the cylinder body 5 and the communication groove 175 and the communication hole 117 of the guide member 110.

Further, a portion between the control vale body 145, the large diameter hole portion 115 of the guide member 110, and the hole portion 181 of the cover body 105 configure the small diameter pressure chamber 167. The small diameter pressure chamber 167 communicates with the primary fluid pressure chamber 51 via the communication hole 101 of the cylinder body 5, the chamber 136, and the communication hole 119 of the guide member 110 to allow the fluid pressure of the primary fluid pressure chamber 51 apply on the control valve body 145.

Here, the above-described cup seal 92 is disposed inside the annular groove 176 configuring the chamber 136 of the cylinder pathway 106, and defines the control valve chamber 166 communicating with the chamber 136 via the communication hole 117 of the guide member 110 and the pathway groove 175 of the radial protrusion portion 94 and the small diameter pressure chamber 167 communicating with the chamber 136 via the communication hole 119 of the guide member 110. Also, the cup seal 92 permits the flow of the operating fluid from the control valve chamber 166 to the small diameter pressure chamber 167 by bending the outer circumferential lip portion 142, and interrupts the flow of the operating fluid in the opposite direction.

While the control valve body 145 of the control valve mechanism 90 is separated from the bottom surface of the second hole portion 97 of the radial hole portion 95, the large diameter pressurizing chamber 76 communicates with the reservoir R via the first hole portion 96 of the radial hole 95, the control valve chamber 166, the communication hole 117 of the guide member 110, the pathway groove 175, the communication hold 102, and the mounting hole 18. The opening pathway 170 is configured by letting the large diameter pressurizing chamber 76 communicates with the reservoir R via the first hole portion 96, the control valve chamber 166, the communication hole 117 of the guide member 110, the pathway groove 175, the communication hole 102, and the mounting hole 18, so as to release the fluid pressure of the large diameter pressurizing chamber 76 to the reservoir R via the control valve mechanism 90.

When the fluid pressure of the primary fluid pressure chamber 51 is more than or equal to the fluid pressure of the reservoir R (atmospheric pressure), the outer circumferential lip portion 142 of the cup seal 92 serving as a check valve is inclined by an obtuse angle with respect to the base portion 140 to thereby contact the groove bottom surface of the annular groove 176 configuring an inner circumferential surface of the chamber 136 in the communication path 137 configured by the mounting hole 18, the communication hole 102, the pathway groove 175 of the radial protrusion portion 94, the chamber 136, and the communication hole 101. Then, since the inner circumferential lip portion 141 blocks a gap with respect to the first cylindrical portion 179 of the guide member 110 configuring the communication path 137 while facing the groove bottom surface of the annular groove 176, the cup seal 92 closes the communication path 137. Thereby, the flow of the operating fluid from the primary fluid pressure chamber 51 to the reservoir R via the communication path 137 is interrupted, and the flow of the operating fluid to the control valve chamber 166 is also interrupted. On the other hand, when the fluid pressure of the primary fluid pressure chamber 51 becomes lower than the fluid pressure of the reservoir R (atmospheric pressure), the outer circumferential lip portion 142 of the cup seal 92 is bent so as to be substantially perpendicular to the base portion 140, and is separated from the groove bottom surface of the annular move 176 configuring the communication path 137 due to a difference in fluid pressure to thereby open the communication path 137. Accordingly, the flow of the operating fluid from the reservoir R to the primary fluid pressure chamber 51 via the bypass pathway 91 is permitted. At this time, the operating fluid flowing from the side of the pathway groove 175 of the radial protrusion portion 94 flows to the side of the outer circumferential lip portion 142 via a gap between the cup seal 92 and an end surface on the side of the pathway groove 175 of the annular groove 176, and passes through the notch, groove 184 of the middle protrusion portion 183 via a gap between the outer circumferential lip portion 142 and the groove bottom surface of the annular groove 176, and thus a large amount of the operating fluid passes through the cup seal 92.

According to the second embodiment described above, since the cup seal 92 is retained in the annular groove 176 formed in the second hole portion 97 of the radial hole 95 configuring an inner circumferential surface of the cylinder pathway 106, a flange portion for retaining the cup seal 92 in the guide member 110 is unnecessary, and thus the cover body 105 may also be provided with the hole portion 181 having a constant diameter. Accordingly, since the guide member 110 and the cover body 105 can be formed in a simple shape, a decrease in the cost of the master cylinder can further be realized.

In addition, since the cup seal 92 includes the middle protrusion portion 18 that is provided, between the outer circumferential lip portion 142 and the inner circumferential lip portion 141 so as to protrude more than the outer circumferential lip portion 142, the axial movement of the cup seal inside the annular groove 176 can be controlled.

Third Embodiment

Figure 5:
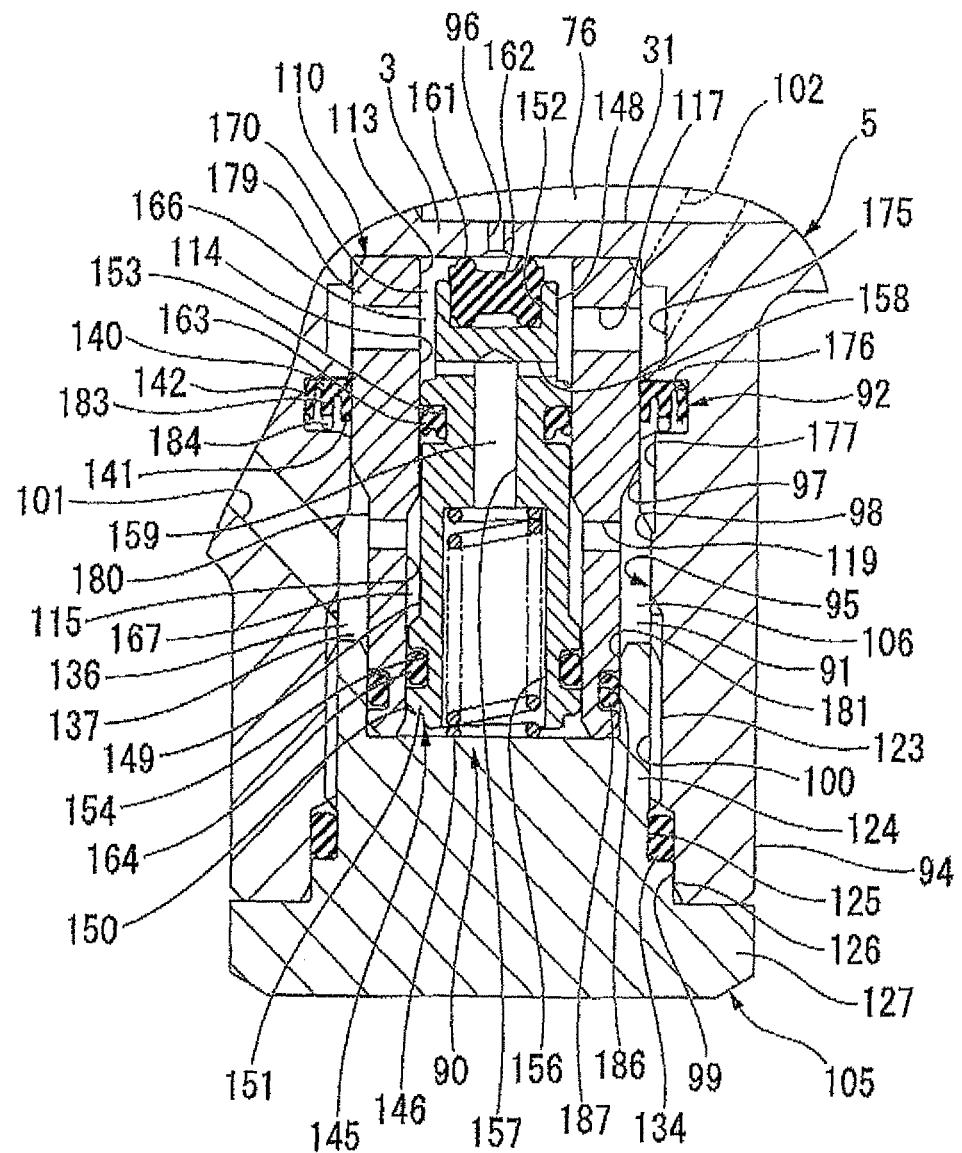
FIG. 5 is an enlarged cross-sectional view showing a main part of a master cylinder according to a third embodiment of the present invention.

Next, a third embodiment of the present invention will be described mainly based on differences between the third embodiment and the second embodiment with reference to FIG. 5. In addition, the same designations and reference numerals will be given to the same components as those of the second embodiment.

In the third embodiment, a part of the configuration of the guide member 110 is different from that of the second embodiment. An axial length of the second cylindrical portion 180 of the guide member 110 in the third embodiment is formed longer compared to the second embodiment so as to be equal to an axial length of the first cylindrical portion 179. In addition, the communication hole 119 is formed on the side of the first cylindrical portion 179 of the second cylindrical portion 180, and an annular seal groove 186 is formed on an outer circumferential side on the opposite side of the first cylindrical portion 179 of the second cylindrical portion 180 so as to be recessed inward in the radial direction.

Further, in the third embodiment, a part of the configuration of the cover body 105 is different from that of the second embodiment. The cover body 105 is not provided with the front end shaft-shaped portion 122 of the second embodiment, and the screw shaft portion 124 is disposed at an end portion on the opposite side of the contact-plate-shaped portion 127. In addition, the hole portion 181 having a constant diameter is formed within the range of the screw shaft portion 124. The hole portion 181 is formed such that the second cylindrical portion 180 of the guide member 110 can be fitted in the inside thereof.

When the male screw 123 formed on the screw shaft portion 124 of the cover body 105 is threaded into the female screw 100 of the radial hole 95, an end surface on the side of the shaft-shaped portion 126 of the contact-plate-shaped portion 127 comes into contact with a front end surface of the radial protrusion portion 94, and an end surface on the opposite side of the first cylindrical portion 179 of the second cylindrical portion 180 of the guide member 110 comes into contact with a bottom surface of the hole portion 181. Accordingly, the guide member 110 is fixed to the radial protrusion portion 94 by the cover body 105 while being disposed coaxially with the radial hole 95 and the cover body 105. In this state, the seal groove 186 is disposed at the middle position of the axial direction of the hole portion 181 of the cover body 105, and the seal groove 186 is provided with a seal ring 187 for sealing a top between the hole portion 181 and the guide member 110.

Here, while the cover body 105 is threaded into the radial protrusion portion 94 as described above, the chamber 136 is formed in a portion between the side of the third hole portion 98 from the annular groove 176 of the second hole portion 97 of the radial protrusion portion 94, the third hole portion 98, the guide member 110, and the screw shaft portion 124 of the cover body 105.

In the third embodiment, the control valve body 145 having the same configuration as that of the second embodiment and reciprocating vertically along the axial direction of the guide member 110 is slidably accommodated inside the through hole 113 of the guide member 110. Also, the valve spring 146 having the same configuration as that of the second embodiment and biasing the control valve body 145 toward the cylindrical portion 3 of the cylinder body 5 is accommodated therein.

In the control valve body 145, the seal ring 163 and the second shaft portion 149 of the piston member 151 are slidably fitted in the small diameter hole portion 114 of the guide member 110, and the seal ring 164 and the third shaft portion 150 of the piston member 151 are slidably fitted in the large diameter hole portion 115 of the guide member 110. A portion between the control valve body 145 and the large diameter hole portion 115 of the guide member 110 configure the small diameter pressure chamber 167.

According to the third embodiment described above, since the sliding movement of the control valve body 145 can be guided only by the guide member 110 as a single component, the radial hole 95, the guide member 110, and the cover body 105 can be manufactured using relatively less assembling precision, which further facilitates the manufacturing of the master cylinder.

Fourth Embodiment

Figure 6:
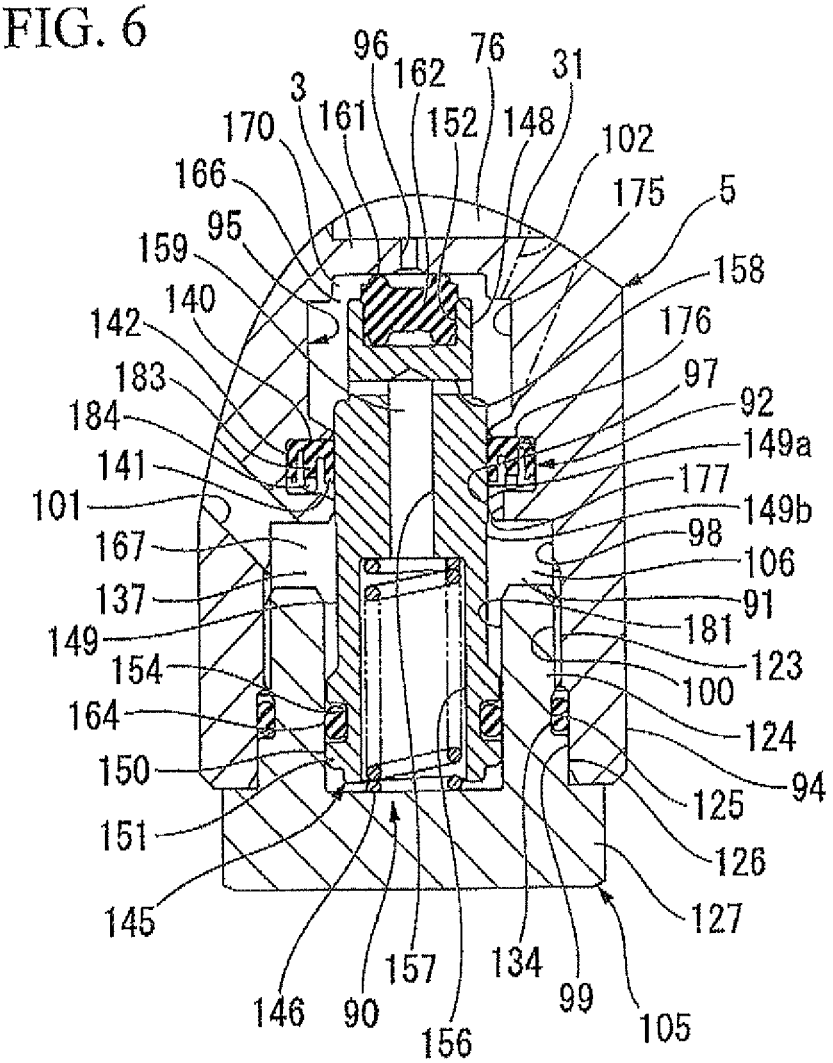
FIG. 6 is an enlarged cross-sectional view showing a main part of a master cylinder according to a fourth embodiment of the present invention.

Next, a fourth embodiment of the present invention will be described mainly based on differences between the fourth embodiment and the second embodiment with reference to FIG. 6. In addition, the same designations and reference numerals will be even to the same components as those of the second embodiment.

In the fourth embodiment, the guide member 110 of the second embodiment is not provided. In addition, the radial hole 95 having a configuration partly different from that of the second embodiment is provided, and the control valve body 145 is directly guided by the second hole portion 97 of the radial hole 95. That is, the inner diameter of the second hole portion 97 is smaller than that of the second embodiment, and the second hole portion 97 is provided with the pathway groove 175, the annular groove 176, and the axial groove 177.

Further, in the fourth embodiment, a part of the configuration of the cover body 105 is different from that of the second embodiment. The cover body 105 is not provided with the front end shaft-shaped portion 122 of the second embodiment, and the screw shaft portion 124 is disposed at the end portion on the opposite side of the contact-plate-shaped portion 127. In addition, the hole portion 181 having a constant diameter is formed within the screw shaft portion 124, the shaft-shaped portion 125, and the shaft-shaped portion 126.

When the cover body 105 is threaded into the female screw 100 of the radial hole 95 via the male screw 123 formed on the screw shaft portion 124, the end surface on the side of the shaft-shaped portion 126 of the contact-plate-shaped portion 127 comes into contact with the front end surface of the radial protrusion portion 94.

In the fourth embodiment, the control valve body 145 reciprocating vertically along the axial direction of the cover body 105 and the guide member 110 is slidably accommodated inside the hole portion 181 of the cover body 105 and the second hole portion 97 of the radial hole 95. Also, the valve spring 146 biasing the control valve body 145 toward the cylindrical portion 3 of the cylinder body 5 is accommodated therein.

A part of the configuration of the control valve body 145 of the fourth embodiment is different from that of the second embodiment, and an outer circumferential side of the second shaft portion 149 of the piston member 151 is formed in a stepped shape including a large diameter portion 149a which is formed on the side of the first shaft portion 148 and a small diameter portion 149b which is formed on the side of the third shaft portion 150 and has a diameter slightly smaller than that of the large diameter portion 149a. In addition, the second shaft portion 149 of the piston member 151 is not provided with the seal ring 163 and the seal groove 153 of the second embodiment. Then, the large diameter portion 149a of the second shaft portion 149 of the piston member 151 is slidably fitted in the cup seal 92 retained in the annular groove 176 of the second hole portion 97 and the second hole portion 97 of the radial hole 95, and the seal ring 164 and the third shaft portion 150 of the piston member 151 are slidably fitted in an inner circumferential surface of the hole portion 181 of the cover body 105.

While the cover body 105 accommodating the control valve body 145 and the valve spring 146 is threaded into the radial protrusion portion 94, a portion between the side of the third hole portion 98 including the axial groove 177 from the annular groove 176 of the second hole portion 97 of the radial protrusion portion 94, the third hole portion 98, the opposite side of the contact-plate-shaped portion 127 of the hole portion 181 of the cover body 105, and the side of the second shaft portion 149 of the control valve body 145 in the cylinder pathway 106 inside the radial protrusion portion 94 configure the small diameter pressure chamber 167 that communicates with the communication hole 101.

In addition, a portion between the bottom surface of the second hole portion 97 of the radial hole 95, the side of the pathway groove 175 of the inner circumferential surface, and the side of the first shaft portion 148 of the control valve body 145 configure the control valve chamber 166. The control valve chamber 166 is in constant communication with the reservoir R via the communication hole 102 of the cylinder body 5.

In addition, the gap between the small diameter pressure chamber 167, the control valve chamber 166, the second hole portion 97 including the annular groove 176 and the axial groove 177, and the second shaft portion 149 of the control valve body 145 configures the communication path 137 of the bypass pathway 91 allowing the reservoir R to communicate with the primary fluid pressure chamber 51 via the mounting hole 18, the communication hole 102, and the communication hole 101, and the cup seal 92 having the same configuration as that of the second embodiment is provided in the annular groove 176 inside the communication path 137. The large diameter portion 149a of the second shaft portion 149 of the control valve body 145 is slidably fitted in the inner circumferential lip portion 141 of the cup seal 92.

Here, the cup seal 92 of the fourth embodiment defines the control valve chamber 166 and the small diameter pressure chamber 167 inside the communication path 137. Also, the cup seal 92 permits the flow of the operating fluid from the control valve chamber 166 to the small diameter pressure chamber 167 by bending the outer circumferential lip portion 142, and interrupts the flow of the operating fluid in the reverse direction. Further, the control valve body 145 of the fourth embodiment generates a thrust force in accordance with the fluid pressure of the small diameter pressure chamber 167 due to a difference in pressure receiving area between the seal diameter of the cup seal 92 and the seal diameter of the seal ring 164 having a diameter larger than that of the cup seal 92.

While the control valve body 145 of the control valve mechanism 90 is separated from the bottom surface of the second hole portion 97 of the radial hole 95, the large diameter pressurizing chamber 76 communicates with the reservoir R via the first hole portion 96 of the radial hole 95, the control valve chamber 166, the communication hole 102, and the mounting hole 18. The opening pathway 170 is formed by letting the large diameter pressurizing chamber 76 communicates with the reservoir R via the first hole pardon 96, the control valve chamber 166, the communication hole 102, and the mounting hole 18, so as to release the fluid pressure of the large diameter pressurizing chamber 76 to the reservoir R via the control valve mechanism 90.

According to the fourth embodiment described above, since the control valve body 145 is directly and slidably retained by the cylinder body 5, the number of components can be decreased, and thus a decrease in the cost of the muster cylinder can further be realized.

In addition, since an outer circumferential surface of the small diameter side of the control valve body 145 can be sealed by the cup seal 92, the number of seal rings can be decreased. For this reason, the number of components can be decreased, and thus a decrease in the cost of the master cylinder can further be realized.

Fifth Embodiment

Figure 7:
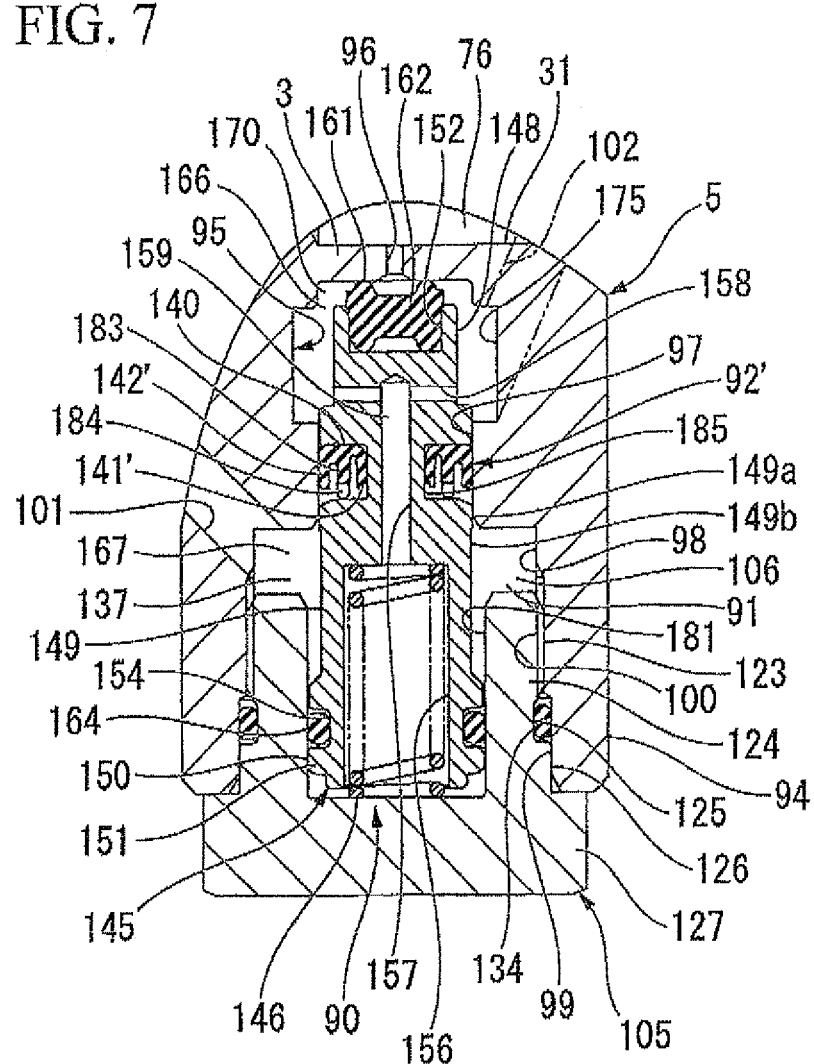
FIG. 7 is as enlarged cross-sectional view showing a main part of a master cylinder according to a fifth embodiment of the present invention.

Next, a fifth embodiment of the present invention will be described mainly based on differences between the fifth embodiment and the fourth embodiment with reference to FIG. 7. In addition, the same designations and reference numerals will be given to the same components as those of the fourth embodiment.

In the fifth embodiment, a part of the configuration of the radial hole 95 is different from that of the fourth embodiment. In the radial hole 95, the second hole portion 97 is not provided with the annular groove 176 and the axial groove 177, and thus the cup seal 92 is not provided in the second hole portion 97.

Further, in the fifth embodiment, a part of the configuration of the control valve body 145 is different from that of the fourth embodiment. In the control valve body 145, an annular groove 185 is formed in the large diameter portion 149a of the second shaft portion 149 so as to be recessed inward in the radial direction, and a cup seal 92' is formed inside the annular groove 185.

The gap between the small diameter pressure chamber 167, the control valve chamber 166, the second hole portion 97, and the second shaft portion 149 of the control valve body 145 including the annular groove 185 configures the communication path 137 of the bypass pathway 91 allowing the reservoir R to communicate with the primary fluid pressure chamber 51 via the mounting hole 18, the communication hole 102, and the communication hole 101, and a cup seal 92' is provided in the annular groove 185 inside the communication path 137.

In the fifth embodiment, a part of the configuration of the cup seal 92' is different from the cup seal 92 of the fourth embodiment. An inner circumferential lip portion 141' of the cup seal 92' is inclinable with respect to the base portion 140, and the radial thickness of the inner circumferential lip portion 141' is thinner than those of an outer circumferential lip portion 142' and the middle protrusion portion 183.

The base portion 140 of the cup seal 92' races the surface on the sidle of the first shaft portion 148 of the annular groove 185, the middle protrusion portion 183 thereof is disposed inside the annular groove 185 so as to come into contact with the surface on the opposite side of the first shaft portion 148 of the annular groove 185, and then the outer circumferential lip portion 142' comes into constantly close contact with the second hole portion 97 of the radial protrusion portion 94. In this state, the inner circumferential lip portion 141' and the outer circumferential lip portion 142' are separated from the surface on the opposite side of the first shaft portion 148 of the annular groove 185, and the side of the base portion 140 of the inner circumferential lip portion 141' and the base portion 140 are separated from the groove bottom surface of the annular groove 185. In addition, the cup seal 92' comes into contact with the groove bottom surface of the annular groove 185 configuring the inner circumferential surface of the communication path 137 of the bypass pathway 91 when the inner circumferential lip portion 141' is in a natural state. When the inner circumferential lip portion 141' is bent toward the middle protrusion portion 183 in this state, the inner circumferential lip portion 141' is separated from the groove bottom surface of the annular groove 185. That is, the inner circumferential lip portion 141' is movable to or from the groove bottom surface of the annular groove 185 configuring the inner circumferential surface of the communication path 137.

Here, the cup seal 92' of the fifth embodiment also defines the control valve chamber 166 and the small diameter pressure chamber 167 inside the communication path 137. Also, the cup seal 92' permits the flow of the operating fluid from the reservoir R to the primary fluid pressure chamber 51 via the communication path 137 in such a manner that the inner circumferential lip portion 141' is bent to be away from the groove bottom surface of the annular groove 185 configuring the inner circumferential surface of the communication path 137, and interrupts the flow of the operating fluid in the reverse direction in such a manner that the inner circumferential lip portion 141' comes into contact with the groove bottom surface of the annular groove 185 configuring the inner circumferential surface of the communication path 137. In addition, the control valve body 145 of the fifth embodiment generates a thrust force in accordance with the fluid pressure of the small diameter pressure chamber 167 due to a difference in pressure receiving area between the seal diameter of the cup seal 92' and the seal diameter of the seal ring 164 having a diameter larger than that of the cup seal 92'.

According to the fifth embodiment described above, since the annular groove 185 is formed in the control valve body 145 separated from the cylinder body 5 to retain the cup seal 92', the cup seal 92' can be easily assembled, and thus a decrease in the cost of the master cylinder can be further realized.

Sixth Embodiment

Next, a sixth embodiment of the present invention will be described mainly based on differences between the sixth embodiment and the first embodiment with reference to FIGS. 8 and 9. In addition, the same designations and reference numerals will be given to the same components as those of the first embodiment.

Figure 8:
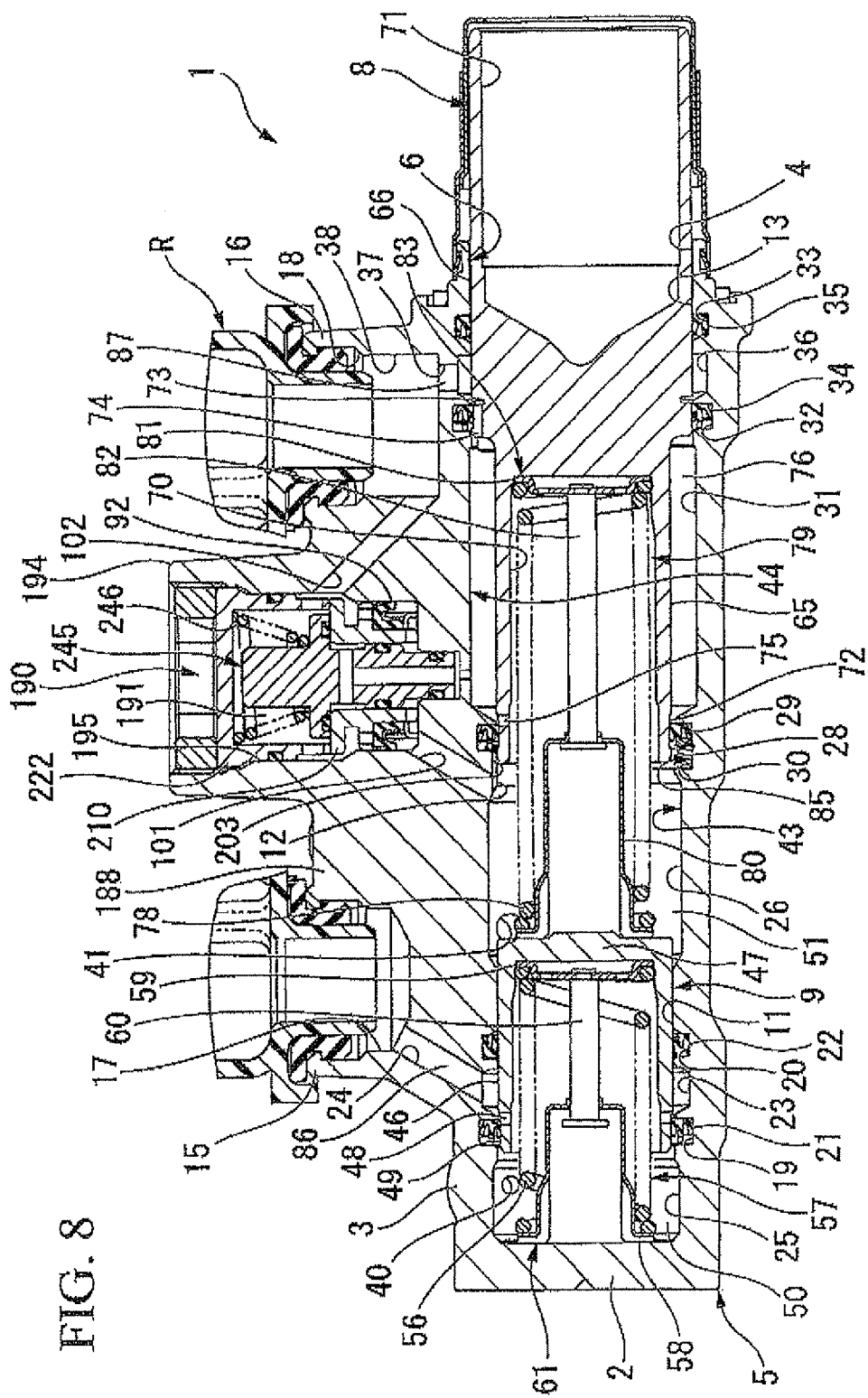
FIG. 8 is a main cross-sectional view showing a roaster cylinder according to a sixth embodiment of the present invention.

In the sixth embodiment, as shown in FIG. 8, a part of the configuration of the cylinder body 5 is different from that of the first embodiment. That is, a connection base portion 188 is formed so as to connect the two mounting pedestal 15 and 16 of the cylinder body 5 in the cylinder axial direction, and the radial protrusion portion 194 configuring the casing, in which the control valve mechanism 190 and the cup seal 92 are assembled, is formed to protrude upward vertically from the mounting pedestal 16 of the connection base portion 188 differently from the first embodiment. The radial protrusion portion 194 and the connection base portion 188 are also integrally formed with the bottom portion 2, the cylindrical portion 3, and the mounting pedestals 15 and 16 at casting of the cylinder body 5.

A radial hole 195 aligned in the vertical direction as the cylinder radial direction is formed inside the radial protrusion portion 194 from the top thereof. As shown in FIG. 9, the radial hole 195 includes a first hole portion 196 which is opened into the opening-side large inner diameter portion 31 to communicate with the large diameter pressurizing chamber 76, a second hole portion 197 which is formed coaxially with the first hole portion 196 and has a diameter larger than that of the first hole 196, a third hole portion 198 which, is formed coaxially with the second hole portion 197 and has a diameter larger than that of the second hole portion 197, a fourth hole portion 199 which is formed coaxially with the third hole portion 198 and has a diameter larger than that of the third hole portion 198, and a fifth hole portion 200 which is formed coaxially with the fourth hole portion 199 and has a diameter larger than that of the fourth hole portion 199, which are sequentially provided from the cylindrical portion 3. The radial hole 195 is opened to the outside at the fifth hole portion 200, and the fifth hole portion 200 is provided with a female screw 201 which is formed within a predetermined distance from the opening portion side. In addition, the radial hole 195 is formed by processing the radial protrusion portion 194 from the front portion thereof in the protrusion direction by a tool.

In the cylinder body 5, the communication hole 101 communicating with the primary fluid pressure chamber 51 is formed by connecting an end portion on the side of the second hole portion 197 of the third hole portion 198 of the radial hole 195 to the vicinity of the boundary between the middle large inner diameter portion 26 and the second small inner diameter sliding portion 12 shown in FIG. 8. In addition, an axial groove 203 is formed at a communication position of the communication hole 101 of the second small inner diameter portion sliding 12 so as to be recessed outward in the cylinder radial direction and to extend in the direction of the cylinder axis.

Figure 9:
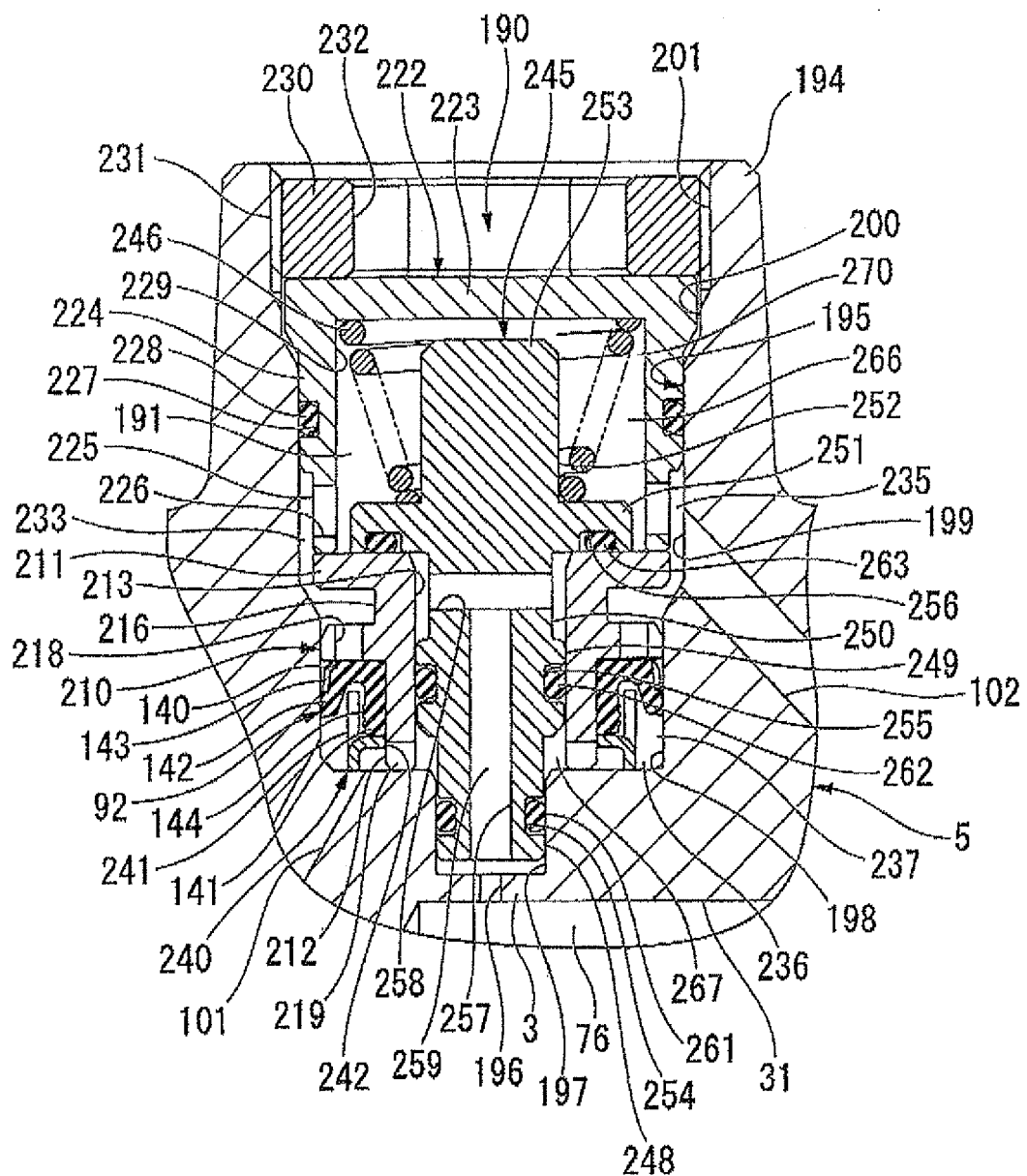
FIG. 9 is an enlarged cross-sectional view showing the main part of the master cylinder according to the sixth embodiment of the present invention.

As shown in FIG. 9, an extension line of the communication hole 101 exists inside the radial hole 195 and extends to the outside from the position inside the opening portion of the radial hole 195. The communication hole 101 is processed and formed by a tool inserted from the radial hole 195.

As shown in FIG. 8, in the cylinder body 5, the communication hole 38 opened into the mounting hole 18 is formed coaxially with the mounting hole 18. An end portion on the side of the third hole portion 198 of the fourth hole portion 199 of the radial hole 195 shown in FIG. 9 communicates with the side of the bottom portion 2 and the side of the bore 6 of an inner circumferential surface of the communication hole 38 shown in FIG. 8 via the communication hole 102. As shown in FIG. 9, an extension line of the communication hole 102 exists inside the radial hole 195 and extends to the outside of the position inside the opening portion of the radial hole 195, and is processed and formed by a tool inserted from the radial hole 195.

A cylindrical first guide member (retaining member) 210 is fitted into the third hole portion 198 and the fourth hole portion 199 of the radial hole 195. One axial side of the that guide member 210 is formed as a disk-shaped portion 211 which is fitted in the third hole portion 198, and the other axial side thereof is formed as a cylindrical portion 212 which has a diameter smaller than that of the disk-shaped portion 211 and is formed coaxially with the disk-shaped portion 211. The first guide member 210 comes into contact with the bottom surface of the third hole portion 198 with the cylindrical portion 212. A through hole 213 is formed inside the first guide member 210 so as to have a substantially constant diameter and to penetrate the first guide member 210 in the axial direction.

A middle portion of the axial direction of the disk-shaped portion 211 is provided with an annular groove 216 which is recessed inward in the radial direction from the outer circumferential portion and is formed coaxially with the through hole 213, and a plurality of communication holes 218 are formed along the axial direction of the disk-shaped portion 211 so as to go through from the annular groove 216 to the side of the cylindrical portion 212. Further, in the cylindrical portion 212 of the first guide member 210, an end portion on the opposite side of the disk-shaped portion 211 is provided with a communication groove 219 which is recessed in the axial direction and penetrates the cylindrical portion 212 in the radial direction. Furthermore, a spacer (not shown) having the same configuration as that of the first embodiment is provided between the plurality of communication holes 218 and the cup seal 92.

A second guide member 222 having a covered cylindrical shape is fitted into the fourth hole portion 199 and the fifth hole portion 200 of the radial hole 195. The second guide member 222 includes a disk-shaped portion 223, a cylindrical portion 224 which protrudes from an outer circumferential side of the disk-shaped portion 223 to have the substantially same diameter while being coaxial therewith, and a front end cylindrical portion 225 which is formed on the opposite side of the disk-shaped portion 223 of the cylindrical portion 224 so as to have an inner diameter equal to that of the cylindrical portion 224 and an outer diameter smaller than that of the cylindrical portion 224 while being coaxial therewith. In the second guide member 222, the disk-shaped portion 223 is fitted in the fifth hole portion 200, the cylindrical portion 224 is fitted in the fourth hole portion 199, and the front end cylindrical portion 225 comes into contact with the disk-shaped portion 211 of the first guide member 210.

In the second guide member 222, a communication hole 226 is formed in the front end cylindrical portion 225 so as to penetrate the front end cylindrical portion 225 in the radial direction, and an annular seal groove 227 is formed in an outer circumferential portion of the cylindrical portion 224 so as to be recessed inward in the radial direction. A seal ring 228 is disposed in the seal groove 227 so as to seal a gap between the radial hole 195 and the cylindrical portion 224. An internal hole portion 229 formed by the cylindrical portion 224 of the second guide member 222 and the front end cylindrical portion 225 has a constant diameter.

In addition, the cylindrical portion 212 of the first guide member 210 comes into contact with the bottom surface of the third hole portion 198, and the front end cylindrical portion 225 of the second guide member 222 comes into contact with an outer circumferential side of the disk-shaped portion 211 of the first guide member 210. In this state, when the cover body 230 is threaded into the female screw 201 of the radial hole 195, the first guide member 210 and the second guide member 222 are fixed to the radial protrusion portion 194. In addition, an outer circumferential portion of the cover body 230 is provided with a male screw 231 used to be threaded into the female screw 201, and the center thereof is provided with a hexagonal tool hole 232.

Here, the radial hole 195 is blocked by the second guide member 222 and the cover body 230 configuring the casing together with the radial protrusion portion 194. A bypass pathway 191, which bypasses the supply pathway 85 and allows the reservoir R to communicate with the primary fluid pressure chamber 51, is formed by a portion other than the first hole portion 196 of the radial hole 195 blocked by the cover body 230 and the second guide member 222, the mounting hole 18, the communication hole 38, the communication hole 101, and the communication hole 102. The first guide member 210 is disposed inside the above-described bypass pathway 191. In addition, inside the radial hole 195 of the radial protrusion portion 194 blocked by the second, guide member 222 and the cover body 230 configures a cylinder pathway 233 slidably accommodating a control valve body 245 to be described later of the control valve mechanism 190. The cylinder pathway 233 is also formed along the radial direction of the cylinder body 5, and is formed between the supply pathway 87 allowing the reservoir R to communicate with the large diameter pressurizing chamber 76 and the supply pathway 86 allowing the reservoir R to communicate with the secondary fluid pressure chamber 50.

Here, while the cover body 230 is threaded into the radial protrusion portion 194 as described above, a chamber 235 of a portion between the first guide member 210, the second guide member 222, and the fourth hole portion 199 communicates with the communication hole 102, and a chamber 236 of a portion between the first guide member 210 and the third hole portion 198 communicates with the communication path 101. Then, since the chambers 235 and 236 can communicate with each other via the communication hole 218 and the annular groove 216 formed in the first guide member 210, the chamber 235, the annular grove 216, the communication hole 218, and the chamber 236 configure a communication path 237 that is configured to allow the reservoir R to communicate with the primary fluid pressure chamber 51 via the mounting hole 18, the communication hole 38, the communication hole 102, and the communication hole 101.

Then, the cup seal 92 having the same configuration as that of the first embodiment and retained by a retaining member 240 and the first guide member 210 provided inside the bypass pathway 191 is provided inside the chamber 236 configuring the communication path 237 of the bypass pathway 191.

The retaining member 240 includes a cylindrical upright wall portion 241 and a locking piece portion 242 which is provided at a plurality of positions of the circumferential direction of the upright wall portion 241 so as to be cut down from one side in the axial direction to the inside in the radial direction. Then, in the retaining member 240, the other side in the axial direction of the upright wall 241 comes into contact with the bottom surface of the third hole portion 198, and the plurality of locking piece portions 242 engage with an outer circumferential surface of the cylindrical portion 212 of the first guide member 210. In addition, a communication hole (not shown) is formed in the other end side of the upright wall portion 241 so as to be recessed in the axial direction and to penetrate the uptight wall portion 241 in the radial direction.

In the cup seal 92, the base portion 140 is disposed between the upright wall portion 241 of the retaining member 240 and the disk-shaped portion 211 of the first guide member 210, and the inner circumferential lip portion 141 is disposed on the inside in the radial direction of the upright wall portion 241 of the retaining member 240. In this state, the inner circumferential lip portion 141 is fitted in the cylindrical portion 212 of the first guide member 210 so as to come into close contact therewith. At this time, the base portion 140 of the cup seal 92 can form an axial gap with respect to the upright wall portion 241 of the retaining member 240, and the inner circumferential lip portion 141 can form a radial gap with respect to the upright wall portion 241 of the retaining member 240. Since the inner circumferential lip portion 141 comes into contact with the locking piece portion 242 of the retaining member 240, the axial movement of the cup seal 92 with respect to the fast guide member 210 is controlled.

In addition, the outer circumferential lip portion 142 of the cup seal 92 is disposed on the outside of the upright wall portion 241 of the retaining member 240, and in a natural state, comes into contact with an inner circumferential surface of the third hole portion 198 of the radial hole 195 configuring an inner circumferential surface of the communication path 237 of the bypass pathway 191. In this state, the outer circumferential lip portion 142 forms a radial gap with respect to the upright wall portion 241 of the retaining member 240. When the outer circumferential lip portion 142 is bent toward the upright wall portion 241 with the amount of the gap, the outer circumferential lip portion 142 is separated from an inner circumferential surface of the third hole portion 198. That is, the outer circumferential lip portion 142 is movable to or from the third hole portion 198 configuring an inner circumferential surface of the communication path 237 of the bypass pathway 191.

Then, the cup seal 92 permits the flow of the operating fluid from the reservoir R to the primary fluid pressure chamber 51 via the communication path 237 of the bypass pathway 191 in such a manner that the outer circumferential lip portion 142 is bent to be away from the third hole portion 198 configuring the inner circumferential surface of the communication path 237, and interrupts the flow of the operating fluid in the reverse direction in such a manner that the outer circumferential lip portion 142 comes into contact with the third hole portion 198 configuring the inner circumferential surface of the communication path 137 of the bypass pathway 191. That is, when the fluid pressure of the primary fluid pressure chamber 51 is more than or equal to the fluid pressure of the reservoir R (atmospheric pressure), the outer circumferential lip portion 142 of the cup seal 92 blocks the communication path 237 by being brought into contact with the inner circumferential surface of the communication path 237 of the bypass pathway 191, so that the flow of the operating fluid from the primary fluid pressure chamber 51 to the reservoir R via the bypass pathway 191 is regulated. On the other hand, when the fluid pressure of the primary fluid pressure chamber 51 becomes lower than the fluid pressure of the reservoir R (atmospheric pressure), the outer circumferential lip portion 142 of the cup seal 92 is bent to be away from the inner circumferential surface of the communication path 237 due to a difference in fluid pressure to open the communication path 237, so that the flow of the operating fluid from the reservoir R to the primary fluid pressure chamber 51 via the bypass pathway 191 is permitted.

The control valve body 245 reciprocating along the axial direction of the first guide member 210 and the second guide member 222 is slidably accommodated inside the second hole portion 197 of the radial hole 195, inside the through hole 213 of the first guide member 210, and inside the hole portion 229 of the second guide member 222 inside the cylinder pathway 233, and a valve spring 246 for biasing the control valve body 245 toward the cylindrical portion 3 of the cylinder body 5 is also accommodated therein. The control valve body 245 and the valve spring 246 configure the control valve mechanism 190.

The control valve body 245 includes, sequentially provided from one side in the axial direction, a piston member 253 that has a first shaft portion 248, a second shaft portion 249 which is formed coaxially with the first shaft portion 248 and has a diameter larger than that of the first shaft portion 248, a third shaft portion 250 which is formed coaxially with the second shaft portion 249 and has a diameter larger than that of the second shaft portion 249, a disk-shaped portion 251 which is formed coaxially with the third shaft portion 250 and has a diameter larger than that of the second shaft portion 249, and an end shaft portion 252 which is formed coaxially with the disk-shaped portion 251 and has a diameter smaller than that of the disk-shaped portion 251. An annular seal groove 254 is formed in an outer circumferential portion of the first shaft portion 248 of the piston member 253 so as to be recessed inward in the radial direction and to be coaxial therewith. An annular seal groove 255 is formed in an outer circumferential portion of the second shaft portion 249 so as to be recessed inward in the radial direction and to be coaxial therewith. In addition, an annular seal groove 256 is formed in an end surface on the side of the third shaft portion 250 of the disk-shaped portion 251 so as to be recessed in the axial direction and to be coaxial therewith.

Further, the piston member 235 is provided with an axial hole portion 257 which is formed in an end surface of the first shaft portion 248 along the axial direction, and a perpendicular hole portion 258 which is formed in an end portion inside the axial hole portion 257 so as to be perpendicular thereto in the radial direction. The axial hole portion 257 and the perpendicular hole portion 258 configure an internal pathway 259 of which one end side is opened into the axial end portion of the first shaft portion 248, and the other end side is opened into the outer diameter surface of the third shaft portion 250. In the piston member 253, the first shaft portion 248 is slidably fitted in the second hole portion 197 of the radial hole 195, and the second shaft portion 249 is slidably fitted in the through hole 213 of the first guide member 210. In addition, an end surface on the side of the third shaft portion 250 of the disk-gaped portion 251 can come into contact with an end surface on the opposite side of the cylindrical portion 212 of the disk-shaped portion 211 of the first guide member 210.

The control valve body 245 includes a seal ring 261 which is fitted in the seal groove 254 of the first shaft portion 248 to constantly seal a gap between the first shaft portion 248 and the second hole portion 197 of the radial hole 195, a seal ring 262 which is fitted in the seal groove 255 of the second shaft portion 249 to constantly seal a gap between the second shaft portion 249 and the through hole 213 of the first guide member 210, and a seal ring 263 which is fitted in the seal groove 256 of the disk-shaped portion 251 to open or close a gap between the disk-shaped portion 211 of the first guide member 210 and the disk-shaped portion 251.

The valve spring 246 is a coil spring that has a tapered shape of which a diameter increases as it approaches one side in the axial direction, and the end shaft portion 252 of the piston member 253 is inserted through the inside of a small-diameter-side end portion thereof so that the small-diameter-side end portion comes into contact with the disk-shaped portion 251. A large-diameter-side end portion of the valve spring 246 comes into contact with a bottom surface of the hole portion 229 of the second guide member 222. Accordingly, the valve spring 246 biases the control valve body 245 in a direction in which the disk-shaped portion 251 and the seal ring 263 come into contact with the disk-shaped portion 211 of the first guide member 210.

In the above-described cylinder pathway 233, mainly, a portion between the second guide member 222 and the control valve body 245 configures a control valve chamber 266. The control valve body 266 is in constant communication with the reservoir R via the communication hole 102 of the cylinder body 5, the chamber 235 between the fourth hole portion 199 of the radial hole 195, the second guide member 222 and the first guide member 210, and the communication hole 226 of the second guide member 222. On the other hand, the control valve chamber 266 can communicate with the large diameter pressurizing chamber 76 via the first hole portion 196 of the radial hole 195 and the internal pathway 259 of the control valve body 245. Here, the communicating/blocking operation with respect to the large diameter pressurizing chamber 76 is performed mainly by the seal ring 263 of the control valve body 245.

Further, in the cylinder pathway 233, a portion between the first guide member 210 and the first shaft portion 248 of the control valve body 245 configures a small diameter pressure chamber 267. The small diameter pressure chamber 267 is in constant communication with the primary fluid pressure chamber 51 via the communication hole 101 of the cylinder body 5, the chamber 236, a communication groove (not shown) of the retaining member 240, and the communication groove 219 of the first guide member 210, so that the fluid pressure of the primary fluid pressure chamber 51 acts on the control valve body 245. The fluid pressure of the primary fluid pressure chamber 51 introduced into the small diameter pressure chamber 267 acts on a portion sealed by the small diameter seal ring 261 and a portion sealed by the large diameter seal ring 262 of the control valve body 245, and thus a thrust force is generated in the control valve body 245 due to a difference in pressure receiving area.

The above-described cup seal 92 is disposed inside the chamber 236 of the cylinder pathway 233, and defines the control valve chamber 266 communicating with the chamber 236 via the communication hole 226 of the second guide member 222, the chamber 235, and the annular groove 216 and the communication hole 218 of the first guide member 210, and the small diameter pressure chamber 267 communicating with the chamber 236 via the communication groove 219 of the first guide member 210 and a communication groove (not shown) of the retaining member 240. The cup seal 92 permits the flow of the operating fluid from the control valve chamber 266 to the small diameter pressure chamber 267 by bending the outer circumferential lip portion 142, and interrupts the flow of the operating fluid in the reverse direction.

While the seal ring 263 of the control valve body 245 of the valve mechanism 190 is away from an end surface of the disk-shaped portion 211 of the first guide member 210, the large diameter pressurizing chamber 76 communicates with the reservoir R via the first hole portion 196 of the radial hole 195, the internal pathway 259 of the control valve body 245, the control valve chamber 166, the communication hole 226 of the second guide member 222, the chamber 235, the communication hole 102, the communication hole 38, and the mounting hole 18. An opening pathway 270 is formed by letting the large diameter pressurizing chamber 76 communicates with the reservoir R via the first hole portion 196 of the radial hole 195, the internal pathway 259 of the control valve body 245, the control valve chamber 166, the communication hole 226 of the second guide member 222, the chamber 235, the communication hole 102, the communication hole 38, and the mounting hole 18, so as to release the fluid pressure of the large diameter pressurizing chamber 76 to the reservoir R via the control valve mechanism 190.

When the fluid pressure of the primary fluid pressure chamber 51 is more than or equal to the fluid pressure of the reservoir R (atmospheric pressure), the outer circumferential lip portion 142 of the cup seal 92 serving as a check valve comes into contact with an inner circumferential surface of the third hole portion 198 configuring the communication path 237 so as to close the communication path 237. Accordingly, the flow of the operating fluid from the primary fluid pressure chamber 51 to the reservoir R via the communication path 237 is interrupted, and the flow of the operating fluid to the control valve chamber 266 is also interrupted. On the other hand, when the fluid pressure of the primary fluid pressure chamber 51 becomes lower than the fluid pressure of the reservoir R (atmospheric pressure), the outer circumferential lip portion 142 is bent so as to be away from the inner circumferential surface of the third hole portion 198 configuring the communication path 237 due to a difference in fluid pressure and to open the communication path 237. Thereby, the flow of the operating fluid from the reservoir R to the primary fluid pressure chamber 51 via the bypass pathway 191 is permitted. At this time, the operating fluid passing through the communication hole 218 of the first guide member 120 flows to the side of the outer circumferential lip portion 142 between the cup seal 92 and the disk-shaped portion 211 mainly via the pathway groove 143 of the cup seal 92, and passes through between the outer circumferential lip portion 142 and the third hole portion 198, thereby passing through a portion where the cup seal 92 is disposed in the communication path 237.

With the above-described configuration, when the operating fluid of the primary fluid pressure chamber 51 is pumped up by a pump (not shown) of the vehicle attitude stability control system, the primary fluid pressure chamber 51 enters a negative pressure state due to the suction pressure. Then, the cup seal 92 as bent as described above to open the valve, and a larger amount of the operating fluid flows from the reservoir R to the primary fluid pressure chamber 51 via the communication path 237 compared to the operating fluid flowing via the supply path 85 formed between the cylinder body 5 and the primary piston 8 and entering a communication state by opening the valve of the seal ring 29, thereby a large amount of the operating fluid can be flowed through the supply path 85 and the communication path 237.

The small diameter pressure chamber 267 of the control valve mechanism 190 is in constant communication with the primary fluid pressure chamber 51 via the communication hole 101, the chamber 236, and the communication hole 219 of the first guide member 210. As a result, a thrust force, that is, a valve-opening-direction thrust force against the biasing force of the valve spring 246, is generated in the control valve body 245 due to a difference in the pressure receiving area of the seal rings 261 and 262 and the fluid pressure of the primary fluid pressure chamber 51. Accordingly, when the control valve body 245 moves against the biasing force of the valve spring 246, the seal ring 263 is separated from the first guide member 210 so as to open the opening pathway 270, and the fluid pressure of the large diameter pressurizing chamber 76 communicating via the first hole portion 196 of the opening pathway 270 and the internal pathway 259 is released to the reservoir R via the opening pathway 270. Here, the thrust force generated in the control valve body 245 is varied in accordance with the pressure of the primary fluid pressure chamber 51 introduced into the small diameter pressure chamber 267. As a result, the control valve body 245 releases the fluid pressure of the large diameter pressurizing chamber 76 to the reservoir R so that the fluid pressure of the large diameter pressurizing chamber 76 is gradually decreased in accordance with an increase in the fluid pressure of the primary fluid pressure chamber 51.

That is, in the above described fast fill, the seal ring 29 is pushed to be opened, and the operating fluid is transferred from the large diameter pressurizing chamber 76 to the primary fluid pressure chamber 51 via a gap between the cylinder body 5 and the primary piston 8 so as to replenish the ineffective fluid amount (an amount of rollback of a caliper piston caused by a seal disposed on the brake caliper) at the initial stroke. Then, when the fluid pressures of the large diameter pressurizing chamber 76 and the primary fluid pressure chamber 51 similarly increase up to the pressurizing chamber releasing fluid pressure, the control valve body 245 of the control valve mechanism 190 which has been in a closed state is opened, and the fluid pressure of the large diameter pressurizing chamber 76 is released to the reservoir R, and thus the fluid pressure of the large diameter pressurizing chamber 76 is released. At this time, the control valve mechanism 190 releases the fluid pressure of the large diameter pressurizing chamber 76 to the reservoir R so that the fluid pressure of the large diameter pressurizing chamber 76 is gradually decreased in accordance with an increase in the fluid pressure of the primary fluid pressure chamber 51.

According to the sixth embodiment, the cup seal 92 is used as a check valve that is installed in the bypass pathway 191 to open the valve when the pressure inside the primary fluid pressure chamber 51 is lower than the pressure of the reservoir R, where the cup seal 92 permits the flow of the operating fluid from the reservoir R to the primary fluid pressure chamber 51 in such a manner that the outer circumferential lip portion 142 is bent to be away from the inner circumferential surface of the third hole portion 198 configuring the communication path 237 of the bypass pathway 191, and interrupts the flow of the operating fluid in the reverse direction in such a manner that the outer circumferential lip portion 142 comes into contact with the inner circumferential surface of the third hole portion 198. For this reason, the operating fluid of the reservoir R can be made to flow by the suction from the downstream side while suppressing an increase in the size and cost of the master cylinder.

Further, the large diameter pressurizing chamber 76 having a diameter larger than that of the primary fluid pressure chamber 51 is formed by using the stepped cylinder body 5 and the stepped secondary piston 9. Then, the control valve mechanism 190 is provided so as to perform a fast fill in which the seal ring 29 is pushed to be opened and the operating fluid is supplied from the large diameter pressurizing chamber 76 to the primary fluid pressure chamber 51, and to release the fluid pressure of the large diameter pressurizing chamber 76 to the reservoir R so that the fluid pressure thereof is decreased after the fast fill. Since the cup seal 92 is provided inside the control valve mechanism 190, an increase in size and cost can be effectively suppressed.

Specifically, the cup seal 92 is provided inside the cylinder pathway 233 accommodating the control valve body 245 of the control valve mechanism 190 so as to define the control valve chamber 266 performing the communicating/blocking operation with respect to the large diameter pressurizing chamber 76 using the control valve body 245 and the small diameter pressure chamber 267 allowing the fluid pressure of the primary fluid pressure chamber 51 to act on the control valve body 245. Since the cup seal 92 permits the flow of the operating fluid from the control valve chamber 266 to the small diameter pressure chamber 267 by bending the outer circumferential lip portion 142 and interrupts the flow of the operating fluid in the opposite direction, the operating fluid is made to flow from the control valve chamber 266 constantly communicating with the reservoir R of the control valve mechanism 190 to the small diameter pressure chamber 267 constantly communicating with the primary fluid pressure chamber 51. Accordingly, the pathway of the control valve mechanism 190 can also be used as the fluid supply pathway during pumping-up.

Further, since the cup seal 92 is retained in the bypass pathway 191 by the first guide member 210 provided inside the bypass pathway 191, the cup seal 92 can be assembled in the cylinder body 5 in the state where the cup seal 92 is retained in advance in the first guide member 210 separated from the cylinder body 5, which facilitates the assembling of the master cylinder.

Furthermore, since the cylinder pathway 233 is formed along the radial direction of the cylinder body 5, the processing thereof is facilitated. Further, since the cylinder pathway 233 is formed upward in the radial direction as in the mounting pedestals 15 and 16, the processing direction is the same, and thus the processing time can be shortened.

Moreover, the secondary piston 9 is provided inside the cylinder body 5 slidable together with the primary piston 8, the secondary piston 9 and the small diameter cylinder portion 43 configure the secondary fluid pressure chamber 50, and the cylinder pathway 233 is formed between the supply pathway 87 allowing the reservoir R to communicate with the large diameter pressurizing chamber 76 and the supply pathway 86 allowing the reservoir R to communicate with the secondary fluid pressure chamber 50. Accordingly, the communication hole 102 allowing the cylinder pathway 233 to communicate with the reservoir R can be easily formed while avoiding the interferences of the supply paths 86 and 87.

Seventh Embodiment

Next, a seventh embodiment of the present invention will be described mainly based on differences between the seventh embodiment and the first embodiment with reference to FIGS. 10 and 11. In addition, the same designations and reference numerals will be given to the same components as those of the first embodiment.

Figure 10:
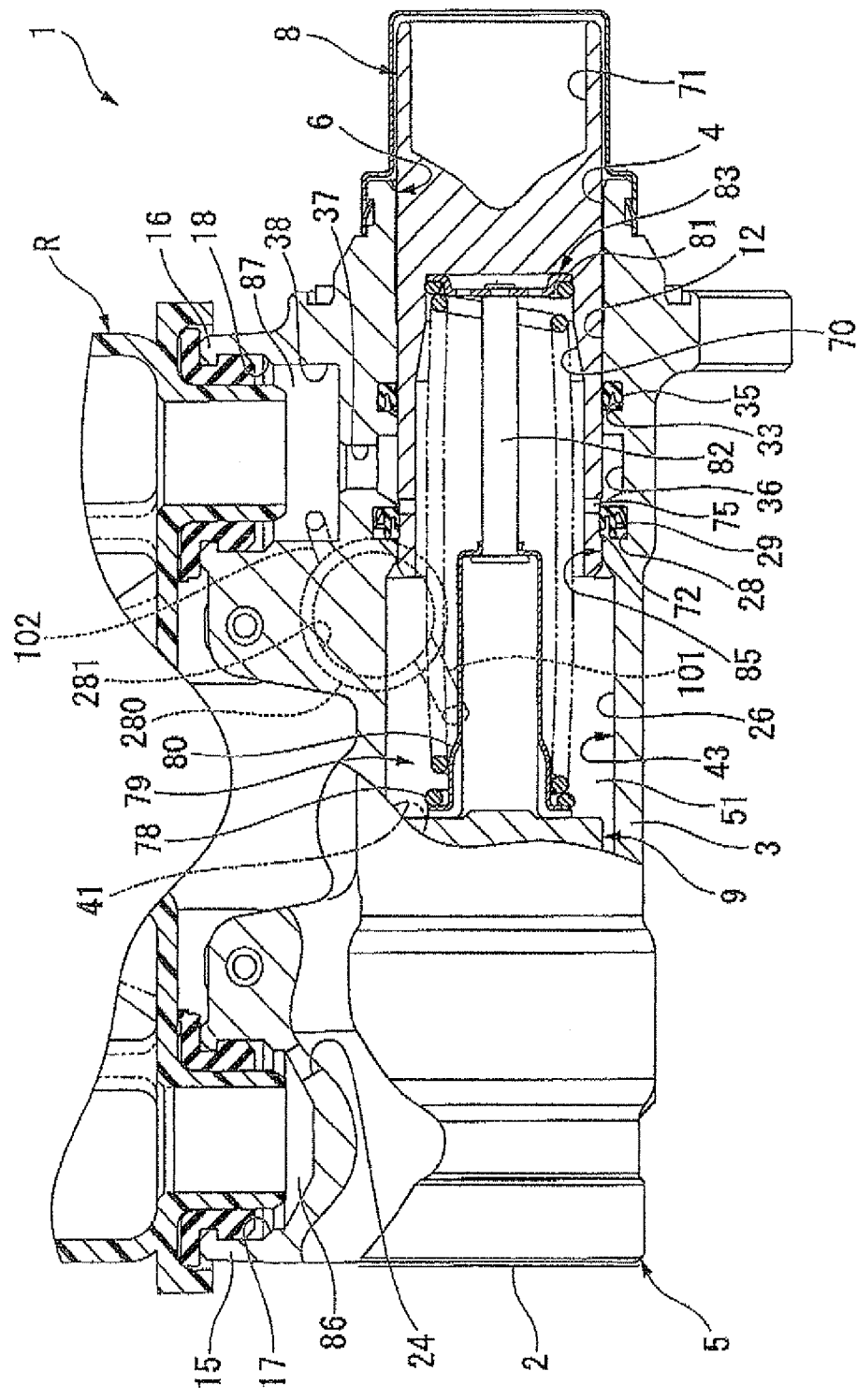
FIG. 10 is a main cross-sectional view showing a master cylinder according to a seventh embodiment of the present invention.

In the seventh embodiment, as shown in FIG. 10, first, a part of the configuration of the cylinder body 5 is different from that of the first embodiment. That is, the cylinder body 5 of the seventh embodiment is not provided with the large inner diameter portion sliding 13 and the opening-side large inner diameter portion 31 of the first embodiment. In addition, the second small inner diameter sliding portion 12 is provided with the seal circumferential groove 28 which the seal ring 29 is disposed and the seal circumferential groove 33 which is formed on the side of the opening portion 4 to dispose the seal ring 35 thereon. Further, the opening groove 36 is formed between the seal circumferential grooves 28 and 33 so as to be in constant communication with the reservoir R via the communication holes 37 and 38. Accordingly, the cylinder body 5 is provided with only the small diameter cylinder portion 43.

In addition, the primary piston 8 of the seventh embodiment slidably inserted into the second small inner diameter sliding portion 12 of the cylinder body 5 has a constant outer diameter except for the annular recess portion 72, and is not provided with the annular groove 73 and the communication groove 74. Accordingly, in the seventh embodiment, the large diameter pressurizing chamber 76 is not formed, and when the primary piston 8 is located at the initial position which is closest to the opening portion 4, the primary fluid pressure chamber 51 is located at the position of opening the port 75 into the opening groove 36, and thus the primary fluid pressure chamber 51 communicates with the reservoir R via the supply pathway 87 configured by the opening groove 36, the communication holes 37 and 38, and the mounting hole 18. Since the master cylinder according to the seventh embodiment is not a fast fill type, the large diameter pressurizing chamber is not provided, and also the control valve mechanism is not provided.

The seal ring 29 provided in the second small inner diameter sliding portion 12 of the cylinder body 5 can interrupt the communication between the primary fluid pressure chamber 51 and the reservoir R when the primary piston 8 locates the port 75 on the side closer to the bottom portion 2 than the seal ring 29. In addition, since the seal ring 29 is a cup seal, the seal ring 29 interrupts the communication between the reservoir R and the primary fluid pressure chamber 51, and permits only the flow of the operating fluid from the reservoir R to the primary fluid pressure chamber 51 when a difference in pressure occurs therebetween.

With the above-described configuration, when the fluid pressure of the primary fluid pressure chamber 51 is lower than the fluid pressure of the reservoir R (=atmospheric pressure), the seal ring 29 opens the valve, and supplies the operating fluid from the reservoir R to the primary fluid pressure chamber 51 via the mounting hole 18a, the communication holes 37 and 38, and a gap between the primary piston 8 and the second small inner diameter sliding portion 12. The mounting hole 18, the communication holes 37 and 38, and the gap formed between the second small diameter sliding inner diameter portion 12 and the primary piston 8 when the seal ring 29 opens the valve configure the supply pathway 85 which supplies the operating fluid from the reservoir R to the primary fluid pressure chamber 51.

When the primary piston 8 moves to the side of the bottom portion 2 from the initial position in response to an input of the brake pedal, the port 75 of the primary piston 8 is blocked by the seal ring 29, and thus the communication between the primary fluid pressure chamber 51 and the reservoir R via the port 75 is interrupted. When the primary piston 8 further moves to the side of the bottom portion 2 in this state, the operating fluid is supplied from the primary fluid pressure chamber 51 to the brake device via the primary discharge path 41.

In the seventh embodiment, a radial protrusion portion 280 configuring the casing, in which the cup seal 92 is assembled, protrudes from the cylindrical portion 5 along the cylinder radial direction toward the horizontal side. The radial protrusion portion 280 is also integrally formed with the bottom portion 2, the cylindrical portion 3, and the mounting pedestals 15 and 16 at the time of casting of the cylinder body 5.

Figure 11:
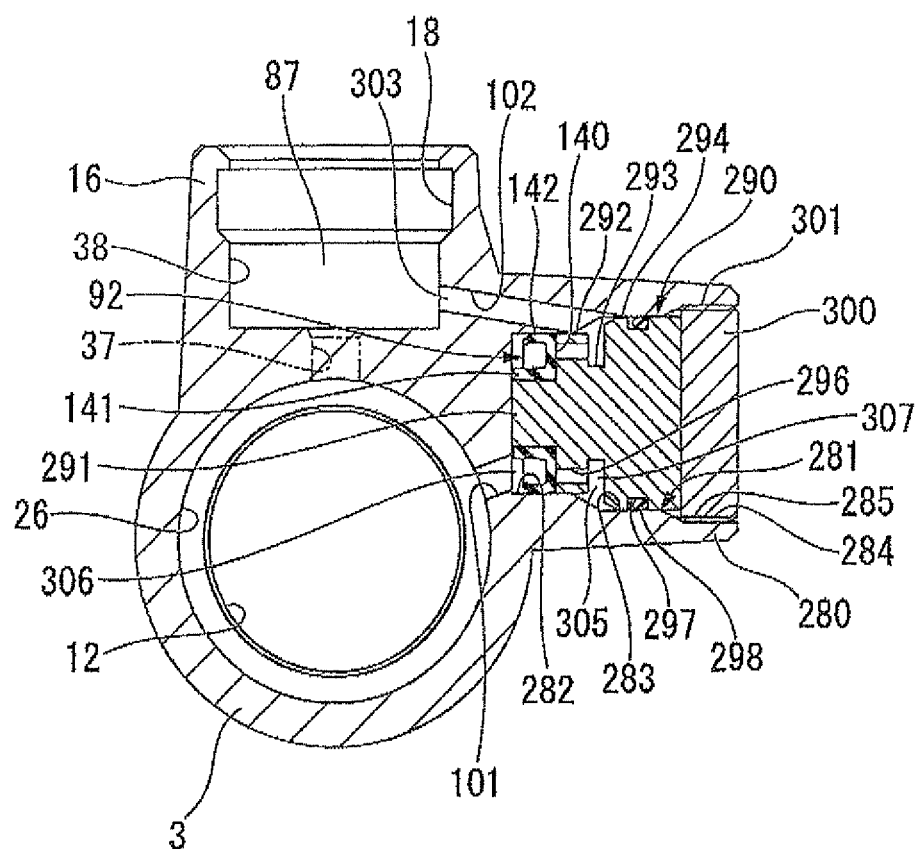
FIG. 11 is an enlarged cross-sectional view showing a main part of the master cylinder according to the seventh embodiment of the present invention.

As shown in FIG. 11, a radial hole 281 is formed inside the radial protrusion portion 280 along the horizontal direction as the cylinder radial direction from the opposite side of the cylindrical portion 3. The radial hole 281 includes a first hole portion 282 which is formed on the side of the cylindrical portion 3, a second hole portion 283 which is formed coaxially with the first hole portion 282 and has a diameter larger than that of the first hole portion 282, and a third hole portion 284 which is formed coaxially with the second hole portion 283 and has a diameter larger than that of the second hole portion 283. The radial hole 281 is opened to the outside from the third hole portion 284, and the third hole portion 284 is provided with a female screw 285 which is formed within a predetermined range of the opening portion side thereof. In addition, the radial hole 281 is formed by processing the radial protrusion portion 280 from the front portion thereof in the protrusion direction by a tool.

In the cylinder body 5, the communication hole 101 communicating with the primary fluid pressure chamber 51 is formed by connecting an inner circumferential surface side of the bottom surface of the first hole portion 281 to the middle large inner diameter portion 26. The extension line of the communication hole 101 exists inside the radial hole 281 and extends to the outside from the position inside the opening portion of the radial hole 281. The communication hole 101 is processed and formed by a tool inserted from the radial hole 281.

As shown in FIG. 10, in the cylinder body 5, the communication hole 38 opened into the mounting hole 18 is formed coaxially with the mounting hole 18. As shown in FIG. 11, the communication hole 102 allows the boundary portion between the first hole portion 282 and the second hole portion 283 of the radial hole 281 to communicate with an inner circumferential surface of the communication hole 38. The extension line of the communication hole 102 also exists inside the radial hole 281 and extends to the outside from the position inside the opening portion of the radial hole 281, and the communication hole 102 is processed and formed by a tool inserted from the radial hole 281.

A stepped-shaft-shaped retaining member 290 is fitted into the first hole portion 282 and the second hole portion 283 of the radial hole 281. The retaining member 290 includes one end shaft portion 291, a disk portion 292 which is formed coaxially with the one end shaft portion 291 and has a diameter larger than that of the one end shaft portion 291, a middle shaft portion 293 which is formed coaxially with the disk portion 292 and has a diameter smaller than that of the disk portion 292, and the other end shaft portion 294 which is formed coaxially with the middle shaft portion 293 and has a diameter larger than that of the disk portion 292. A plurality of communication holes 296 are formed in the disk portion 292 so as to penetrate the disk portion 292 in the axial direction, and an annular seal groove 297 is formed in an outer circumferential portion of the other end shaft portion 294 so as to be recessed inward in the radial direction and to be coaxial therewith.

In the retaining member 290, the one end shaft portion 291 comes into contact with the bottom surface of the first hole portion 282, the disk portion 292 fits in an inner circumferential surface of the first hole portion 282, and the other end shaft portion 294 fits in an inner circumferential surface of the second hole portion 283. In this state, when a cover body 300 is threaded into the female screw 285 of the third hole portion 284, the retaining member 290 is fixed to the radial protrusion portion 280. In addition, a male screw 301 is formed on an outer circumferential portion of the cover body 300 so as to be threaded into the female screw 285. A seal ring 298 is disposed in the seal groove 297 so as to seal a gap between the second hole portion 283 of the radial hole 281 and the other end shaft portion 294.

Here, a bypass pathway 303, which bypasses the supply pathway 85 and allows the reservoir R to communicate with the primary fluid pressure chamber 51, is configured by the radial hole 281 blocked by the cover body 300, the mounting hole 18, the communication hole 38, the communication hole 101, and the communication hole 102. The retaining member 290 is disposed inside the bypass pathway 303.

As described above, while the cover body 300 is threaded into the radial protrusion portion 280, a chamber 305 between the middle portion of the retaining member 290 and the boundary portion of the first hole portion 282 and the second hole portion 283 communicates with the communication bola 102, and a chamber 306 of a portion between the one end shaft portion 291 of the retaining member 290 and the first hole portion 282 communicates with the communication path 101. Then, since the chambers 305 and 306 communicate with each other via the communication hole 296 formed in the retaining member 290, the chamber 305, the communication hole 296, and the chamber 306 configure a communication path 307 allowing the reservoir R to communicate with the primary fluid pressure chamber 51 via the mounting hole 18, the communication hole 38, the communication hole 102, and the communication hole 101.

In addition, the cup seal 92 having the same configuration as that of the first embodiment and retained by the retaining member 290 provided inside the bypass pathway 303 is provided inside the chamber 306 configuring the communication path 307 of the bypass pathway 303. Further, a spacer (not shown) having the same configuration as that of the first embodiment is provided between the communication hole 296 and the cup seal 92.

The cup seal 92 is fitted in the one end shaft portion 291 of the retaining member 290 with the inner circumferential lip portion 141 so as to close contact with the one end shaft portion 291, while the base portion 140 faces the disk portion 292 of the retaining member 290. The outer circumferential lip portion 142 of the cup seal 92 comes into contact with an inner circumferential surface of the first hole portion 282 of the radial hole 281 configuring an inner circumferential surface of the communication path 307 of the bypass pathway 303 when the outer circumferential lip portion 142 is in a natural state. In this state, when the outer circumferential lip portion 142 bends to the side of the inner circumferential lip portion 141, the outer circumferential lip portion 142 is separated from an inner circumferential surface of first hole portion 282. That is, the outer circumferential lip portion 142 is movable to or from the first hole portion 282 configuring the inner circumferential surface of the communication path 307 of the bypass pathway 303.

Then, the cup seal 92 permits the flow of the operating fluid from the reservoir R to the primary fluid pressure chamber 51 via the communication path 307 of the bypass pathway 303 in such a manner that the outer circumferential lip portion 142 bends to be away from the first hole portion 282 configuring the inner circumferential surface of the communication path 307, and interrupts the flow of the operating fluid in the reverse direction in such a manner that the outer circumferential lip portion 142 comes into contact with the first hole portion 282 configuring the inner circumferential surface of the communication path 307 of the bypass pathway 303. That is, when the fluid pressure of the primary fluid pressure chamber 51 is more than or equal to the fluid pressure of the reservoir R (atmospheric pressure), the outer circumferential lip portion 142 of the cup seal 92 blocks the communication path 307 by being brought into contact with the inner circumferential surface of the communication path 307 of the bypass pathway 303, so that the flow of the operating fluid from the primary fluid pressure chamber 51 to the reservoir R via the bypass pathway 303 is controlled. On the other hand, when the fluid pressure of the primary fluid pressure chamber 51 becomes lower than the fluid pressure of the reservoir R (atmospheric pressure), the outer circumferential lip portion 142 of the cup seal 92 is bent to be away from the inner circumferential surface of the communication path 307 due to a difference in fluid pressure to open the communication path 307, so that the flow of the operating fluid from the reservoir R to the primary fluid pressure chamber 51 via the bypass pathway 303 is permitted.

With the above-described configuration, when the operating fluid of the primary fluid pressure chamber 51 is pumped up by a pump (not shown) of the vehicle attitude stability control system, the primary fluid pressure chamber 51 enters a negative pressure state due to the suction pressure. Then, the cup seal 92 is bent as described above to open the valve, and a larger amount of the operating fluid flows from the reservoir R to the primary fluid pressure chamber 51 via the communication path 307 compared with the operating fluid flowing via the supply path 85 formed between the cylinder body 5 and the primary piston g and entering a communication state by opening the valve of the seal ring 29, thereby a large amount of the operating fluid can be flowed through the supply path 85 and the communication path 307.

According to the seventh embodiment, the cup seal 92 is used as a check valve that is installed in the bypass pathway 303 to open the valve when the pressure inside the primary fluid pressure chamber 51 is lower than the pressure of the reservoir R. The cup seal 92 permits the flow of the operating fluid from the reservoir R to the primary fluid pressure chamber 51 in such a manner that the outer circumferential lip portion 142 bends to be away from the inner circumferential surface of the first hole portion 282 configuring the communication path 307 of the bypass pathway 303, and interrupts the flow of the operating fluid in the opposite direction in such a manner that the outer circumferential lip portion 142 comes into contact with the inner circumferential surface of the first hole portion 282. For this reason, the operating fluid of the reservoir R can be made to flow by the suction from the downstream side while suppressing an increase in the size and cost of the master cylinder.

In addition, since the cup seal 92 is retained in the bypass pathway 303 by the retaining member 290 provided inside the bypass pathway 303, the cup seal 92 can be assembled in the cylinder body 5 in the state where the cup seal 92 is retained in advance in the retaining member 290, which facilitates the assembling of the master cylinder.

Eighth Embodiment

Figure 12:
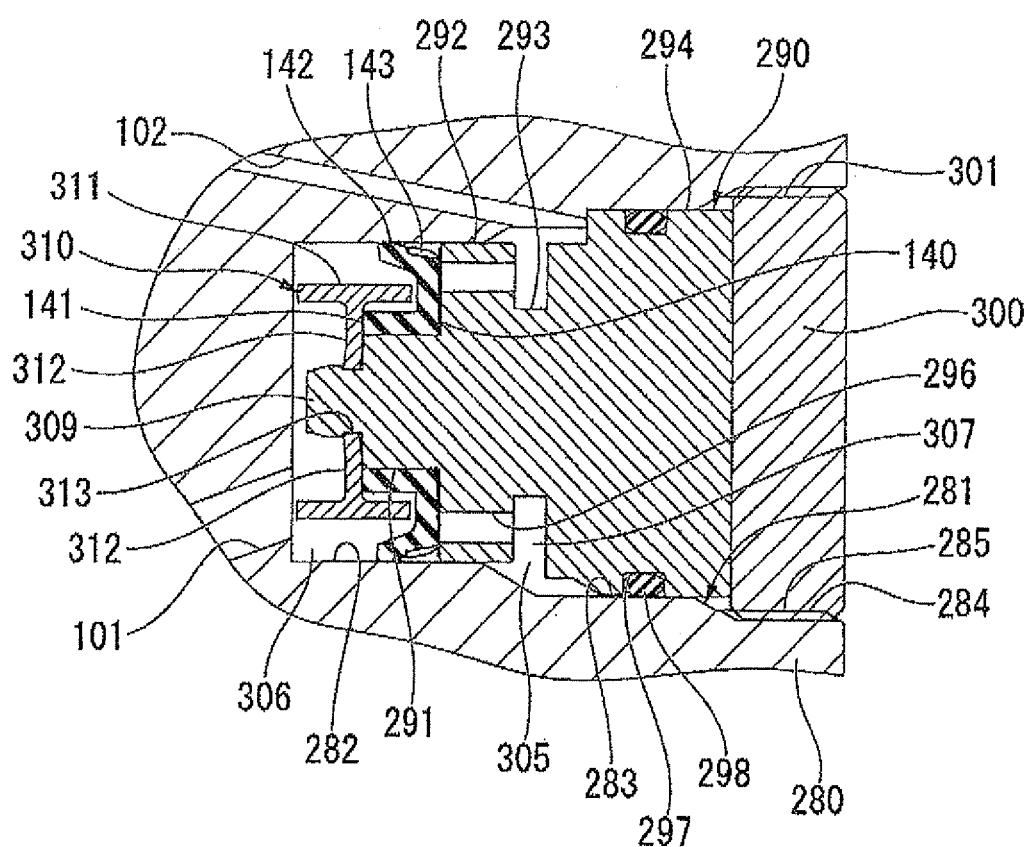
FIG. 12 is an enlarged cross-sectional view showing a main part of a master cylinder according to an eighth embodiment of the present invention.

Next, an eighth embodiment of the present invention will be described mainly based on differences between the eighth embodiment and the seventh embodiment with reference to FIG. 12. In addition, the same designations and reference numerals will be given to the same components as those of the seventh embodiment.

In the eighth embodiment, a part of the configuration of the retaining member 290 is different. That is, a protrusion portion 309 is formed in the one end shaft portion 291 of the retaining member 290 so as to have a she shape and to be coaxial therewith, where the diameter of the protrusion portion 309 is smaller than that of the one end shaft portion 291, and another retaining member 310 is fixed to the protrusion portion 309. The retaining member 310 includes a cylindrical portion 311 and a plate-like portion 312 which extends inward in the radial direction from the axial middle portion of the cylindrical portion 311.

The retaining member 310 is integrated with the retaining member 290 by swaging the protrusion portion 309 while the protrusion portion 309 is inserted into the mounting hole 313 formed at the center of the plate-like portion 312 to allow the plate-like portion 312 to come into contact with the one end shaft on 291. In addition, the inner circumferential lip portion 141 of the cup seal 92 is disposed inside in the radial direction of the cylindrical portion 311, and the outer circumferential lip portion 142 of the cup seal 92 is disposed outside in the radial direction of the cylindrical portion 311 between the plate-shaped portion 312 of the retaining member 310 and the disk portion 292 of the retaining member 290.

Then, in the eighth embodiment, when the fluid pressure of the primary fluid pressure chamber 51 becomes lower than the fluid pressure of the reservoir R (atmospheric pressure), the outer circumferential lip portion 142 is bent to be away from the first hole portion 282 configuring the inner circumferential surface of the communication path 307 within a range of a gap with respect to the cylindrical portion 311 of the retaining member 310 due to a difference in fluid pressure so as to open the communication path 307, so that the flow of the operating fluid from the reservoir R to the primary fluid pressure chamber 51 via the bypass pathway 303 is permitted.

In the eighth embodiment, since the separation of the cup seal 92 from the retaining member 290 can be controlled by the retaining member 310, the cup seal 92 can be assembled in the cylinder body 5 while the cup seal 92 is reliably retained by the retaining member 290, which facilitates the assembling of the master cylinder.

According to the first to eighth embodiments, there is provided a master cylinder including a cylinder body which a operating fluid is introduced from a reservoir, a piston which is slidably fitted in the cylinder body and defines a pressure chamber inside the cylinder body, a supply pathway which is formed in the cylinder body and supplies the operating fluid from the reservoir to the pressure chamber, a bypass pathway which bypasses the supply pathway and allows the reservoir to communicate with the pressure chamber, and a check valve which is installed in the bypass pathway and opens a valve when the pressure inside the pressure chamber is lower than the pressure of the reservoir, wherein the check valve comprised of a cup seal disposed inside the bypass pathway, and is configured to permit the flow of the operating fluid from the reservoir to the pressure chamber in such a manner that its lip portion is bent to be away from an inner circumferential surface of the bypass pathway, and to interrupt the flow of the operating fluid in the reverse direction in such a manner that the lip portion comes into contact with the inner circumferential surface. Accordingly, the operating fluid of the reservoir can be made to smoothly flow by the suction from the downstream side while suppressing an increase in the size and cost of the master cylinder.

Further, according to the first to sixth embodiments, there is provided a master cylinder including a stepped cylinder which includes a large diameter cylinder portion and a small diameter cylinder portion, a stepped piston which includes a large diameter piston portion slidably inserted into the large diameter cylinder portion of the stepped cylinder and a small diameter piston portion slidably inserted into the small diameter cylinder portion, a check opening/closing portion which divides the inside of the stepped cylinder into a large diameter pressurizing chamber on the side of the large diameter piston portion and a small diameter fluid pressure chamber on the side of the small diameter piston portion, and permits only the stream of the operating fluid from the large diameter pressurizing chamber to the small diameter fluid pressure chamber, and a control valve mechanism which includes a control valve body connected to the large diameter pressurizing chamber, the small diameter fluid pressure chamber, and a reservoir and releasing a fluid pressure of the large diameter pressurizing chamber to the reservoir so that the fluid pressure of the large diameter pressurizing chamber is decreased, wherein a cylinder pathway is formed in the control valve mechanism so as to slidably accommodate the control valve body, the cylinder pathway includes a small diameter pressure chamber which communicates with the small diameter fluid pressure chamber and applies the fluid pressure of the small diameter fluid pressure chamber to the control valve body, and a control valve chamber which communicates with the reservoir and the large diameter pressurizing chamber and performs a communicating/blocking operation with respect to the large diameter pressurizing chamber by the control valve body, and the master cylinder further includes a cup seal which defines the control valve chamber and the small diameter pressure chamber while being disposed inside the cylinder pathway, and is configured to permit the flow of the operating fluid from the control valve chamber to the small diameter pressure chamber by bending its lip portion and to interrupt the flow of the operating fluid in the reverse direction. Accordingly, the operating fluid of the reservoir can be made to smoothly flow by the suction from the downstream side while suppressing an increase in the size and cost of the master cylinder. In addition, a large diameter pressurizing chamber having a diameter larger than that of the small diameter fluid pressure chamber is formed by using the stepped cylinder and the stepped piston. A control valve mechanism is provided so as to supply the operating fluid from the large diameter pressurizing chamber to the small diameter fluid pressure chamber via the check opening/closing portion, and to release the fluid pressure of the large diameter pressurizing chamber to the reservoir so that the fluid pressure of the large diameter pressurizing chamber is decreased. Since the cup seal is provided inside the control valve mechanism, an increase in the size and cost of the master cylinder can be effectively suppressed.

Specifically, according to the first to sixth embodiments, the cup seal is provided inside the cylinder pathway accommodating the control valve body of the control valve mechanism so as to define the control valve chamber performing a communicating/blocking operation with respect to the large diameter pressurizing chamber by the control valve body and the small diameter pressure chamber applying the fluid pressure of the small diameter fluid pressure chamber to the control valve body. The cup seal permits the flow of the operating fluid from the control valve chamber to the small diameter pressure chamber by bending its lip portion, and interrupts the flow of the operating fluid in the reverse direction, and thus the operating fluid flows from the control valve chamber communicating with the reservoir of the control valve mechanism to the small diameter pressure chamber communicating with the small fluid pressure chamber. Accordingly, the pathway of the control valve mechanism can also be used as the fluid supply pathway.

Furthermore, according to the first to fourth embodiments and the sixth to eighth embodiments, the cup seal includes the outer circumferential lip portion and the inner circumferential lip portion which extend from the base portion, and the outer circumferential lip portion is inclinable with respect to the base portion. For this reason, the operating fluid can be made to satisfactorily flow when the valve is opened.

Moreover, according to the first to fourth embodiments and the sixth to eighth embodiments, the cup seal includes the outer circumferential lip portion and the inner circumferential lip portion, and the radial thickness of the outer circumferential lip portion is thinner than that of the inner circumferential lip portion. For this reason, the cup seal can open or close the valve while having good response characteristics with respect to a variation in the fluid pressure.

Further, according to the second to fifth embodiments, the cup seal includes the outer circumferential lip portion and the inner circumferential lip portion, and also includes the middle protrusion portion which is formed between the outer circumferential lip portion and the inner circumferential lip portion so as to protrude more than the outer circumferential lip portion. Accordingly, the axial movement of the cup seal can be controlled by the middle protrusion portion.

Furthermore, according to the first and sixth to eighth embodiments, the cup seal is retained in the bypass pathway by the retaining member provided inside the bypass pathway. Accordingly, the assembling can be performed while the cup seal is retained in advance by the retaining member, and thus the assembling is facilitated.

Moreover, according to the second to fourth embodiments, the cup seal is retained in the annular groove formed in the inner circumferential surfer of the cylinder pathway. For this reason, the number of components retaining the cup seal can be simplified, and thus a decrease in the cost of the master cylinder is further realized.

In addition, according to the first to sixth embodiments, the cylinder pathway is formed along the radial direction of the stepped cylinder. For this reason, the processing thereof is facilitated.

Further, according to the first to sixth embodiments, the other slidable piston is provided inside the stepped cylinder together with the stepped piston, and the other fluid pressure chamber is formed by the other piston and the small diameter cylinder portion. Then, the cylinder pathway is formed between one supply pathway allowing the reservoir to communicate with the large diameter pressurizing chamber and the other supply pathway allowing the reservoir to communicate with the other fluid pressure chamber. For this reason, the cylinder pathway can communicate with the reservoir while easily avoiding the interferences between the one supply pathway and the other supply pathway.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A master cylinder comprising:
a cylinder body which an operating fluid is introduced from a reservoir;
a piston which is slidably fitted in the cylinder body and defines a pressure chamber inside the cylinder body;
a supply pathway which is formed in the cylinder body and supplies the operating fluid from the reservoir to the pressure chamber;
a bypass pathway which bypasses the supply pathway and allows the reservoir to communicate with the pressure chamber; and
a check valve which is installed in the bypass pathway and opens a valve when a pressure inside the pressure chamber is lower than a pressure of the reservoir,
wherein the check valve comprised of a cup seal disposed inside the bypass pathway, and configured to permit the flow of the operating fluid from the reservoir to the pressure chamber in such a manner that a lip portion of the cup seal is bent to be away from an inner circumferential surface of the bypass pathway, and to interrupt the flow of the operating fluid in a reverse direction in such a manner that the lip portion comes into contact with the inner circumferential surface.

2. The master cylinder according to claim 1, wherein the cup seal includes an outer circumferential lip portion and an inner circumferential lip portion which extend from a base portion, and
the outer circumferential lip portion is inclinable with respect to the base portion.

3. The master cylinder according to claim 2, wherein the cup seal includes the outer circumferential lip portion and the inner circumferential lip portion, and
a radial thickness of the outer circumferential lip portion is thinner than a radial thickness of the inner circumferential lip portion.

4. The master cylinder according to claim 3, wherein the cup seal includes the outer circumferential lip portion and the inner circumferential lip portion, and
a middle protrusion portion is formed between the outer circumferential lip portion and the inner circumferential lip portion so as to protrude more than the outer circumferential lip portion.

5. The master cylinder according to claim 1, wherein the cup seal is retained in the bypass pathway by a retaining member provided inside the bypass pathway.

6. The master cylinder according to claim 1, wherein the cup seal is retained in an annular groove formed in an inner circumferential surface of the cylinder pathway.

7. A master cylinder comprising:
a stepped cylinder which includes a large diameter cylinder portion and a small diameter cylinder portion;
a stepped piston which includes a large diameter piston portion slidably inserted into the large diameter cylinder portion of the stepped cylinder and a small diameter piston portion slidably inserted into the small diameter cylinder portion;
a check opening/closing portion which divides the inside of the stepped cylinder into a large diameter pressurizing chamber on a side of the large diameter piston portion and a small diameter fluid pressure chamber on a side of the small diameter piston portion, and permits only the flow of a operating fluid from the large diameter pressurizing chamber to the small diameter fluid pressure chamber;
a control valve mechanism which includes a control valve body connected to the large diameter pressurizing chamber, the small diameter fluid pressure chamber, and a reservoir, and releasing a fluid pressure of the large diameter pressurizing chamber to the reservoir so that the fluid pressure of the large diameter pressurizing chamber is decreased,
a cylinder pathway which is formed in the control valve mechanism so as to slidably accommodate the control valve body, the cylinder pathway includes: a small diameter pressure chamber which communicates with the small diameter fluid pressure chamber and applies the fluid pressure of the small diameter fluid pressure chamber to the control valve body; and a control valve chamber which communicates with the reservoir and the large diameter pressurizing chamber and performs a communicating/blocking operation with respect to the large diameter pressurizing chamber by the control valve body; and
a cup seal which defines the control valve chamber and the small diameter pressure chamber while being disposed inside the cylinder pathway, and is configured to permit the flow of the operating fluid from the control valve chamber to the small diameter pressure chamber by bending its lip portion, and to interrupt the flow of the operating fluid in a reverse direction.

8. The master cylinder according to claim 7, wherein the cup seal includes an outer circumferential lip portion and an inner circumferential lip portion which extend from a base portion, and
the outer circumferential lip portion is inclinable with respect to the base portion.

9. The master cylinder according to claim 8, wherein the cup seal includes the outer circumferential lip portion and the inner circumferential lip portion, and
a radial thickness of the outer circumferential lip petition is thinner than a radial thickness of the inner circumferential lip portion.

10. The master cylinder according to claim 9, wherein the cup seal includes the outer circumferential lip portion and the inner circumferential lip portion, and
a middle protrusion portion is formed between the outer circumferential lip portion and the inner circumferential lip portion go as to protrude more than the outer circumferential lip portion.

11. The master cylinder according to claim 7, wherein the cup seal is retained in the bypass pathway by a retaining member provided inside the bypass pathway.

12. The master cylinder according to claim 7, wherein the cup seal is retained in an annular groove formed in an inner circumferential surface of the cylinder pathway.

13. The master cylinder according to claim 7, wherein the cylinder pathway is formed along a radial direction of the stepped cylinder.

14. The master cylinder according to claim 13, wherein another slidable piston is provided inside the stepped cylinder together with the stepped piston, and another fluid pressure chamber is formed by the another piston and the small diameter cylinder portion, and
the cylinder pathway is formed between one supply pathway allowing the reservoir to communicate with the large diameter pressurizing chamber and another supply pathway allowing the reservoir to communicate with the another fluid pressure chamber.

15. A roaster cylinder comprising:
a stepped cylinder which includes a large diameter cylinder portion and a small diameter cylinder portion;
a stepped piston which includes a large diameter piston portion slidably inserted into the large diameter cylinder portion of the stepped cylinder and a small, diameter piston portion slidably inserted into the small diameter cylinder portion;
another piston which is slidably inserted into the small diameter cylinder portion of the stepped cylinder and moves together with the stepped piston,
a check opening/closing portion which divides the inside of the stepped cylinder into a large diameter pressurizing chamber on a side of the large diameter piston portion and a small diameter fluid pressure chamber on a side of the small diameter piston portion, and permits only the flow of an operating fluid from the large diameter pressurizing chamber to the small diameter fluid pressure chamber;
a control valve mechanism which includes a control valve body connected to the large diameter pressurizing chamber, the small diameter fluid pressure chamber, and a reservoir, and releasing a fluid pressure of the large diameter pressurizing chamber to the reservoir so that the fluid pressure of the large diameter pressurizing chamber is decreased,
a cylinder pathway which is formed in the control valve mechanism along a radial direction of the stepped cylinder so as to allow the control valve body to slide thereon, the cylinder pathway includes: a small diameter pressure chamber which communicates with the small diameter fluid pressure chanter and applies the fluid pressure of the small diameter fluid pressure chamber to the control valve body; and a control valve chamber which communicates with the reservoir and the large diameter pressurizing chamber and performs a communicating/blocking operation with respect to the large diameter pressurizing chamber by the control valve body, and
a cup seal which defines the control valve chamber and the small diameter pressure chamber while being immovably disposed inside the cylinder pathway, and is configured to permit the flow of the operating fluid from the control valve chamber to the small diameter pressure chamber via a gap formed between the cup seal and the cylinder pathway, and to interrupt the flow of the operating fluid in an opposite direction.

16. The master cylinder according to claim 15, wherein the cup seal includes an outer circumferential lip portion and an inner circumferential lip portion which extend from a base portion, and
the outer circumferential lip portion is inclinable with respect to the base portion.

17. The master cylinder according to claim 16, wherein the cup seal includes the outer circumferential lip portion and the inner circumferential lip portion, and
a radial thickness of the outer circumferential lip portion is thinner than a radial this of the inner circumferential lip portion.

18. The master cylinder according to claim 17, wherein the cup seal includes the outer circumferential lip portion and the inner circumferential lip portion, and
a middle protrusion portion is formed between the outer circumferential lip portion and the inner circumferential lip portion so as to protrude more than the outer circumferential lip portion.

19. The master cylinder according to claim 15, wherein the cup seal is retained in the bypass pathway by a retaining member provided inside the bypass pathway.

20. The master cylinder according to claim 15, wherein the cup seal is retained in an annular groove formed in an inner circumferential surface of the cylinder pathway.

\* \* \* \* \*